US012157568B2

(12) United States Patent
Dey et al.

(10) Patent No.: US 12,157,568 B2
(45) Date of Patent: Dec. 3, 2024

(54) FORMATION FLIGHT OF UNMANNED AERIAL VEHICLES

(71) Applicant: Telefonaktiebolaget LM Ericsson (publ), Stockholm (SE)

(72) Inventors: Kaushik Dey, Kolkata (IN); Abhishek Sarkar, Bengaluru (IN); Ashis Kumar Roy, Durgapur (IN); Dhiraj Nagaraja Hegde, Bengalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 373 days.

(21) Appl. No.: 17/285,684

(22) PCT Filed: Jan. 22, 2019

(86) PCT No.: PCT/IN2019/050048
§ 371 (c)(1),
(2) Date: Apr. 15, 2021

(87) PCT Pub. No.: WO2020/079702
PCT Pub. Date: Apr. 23, 2020

(65) Prior Publication Data
US 2021/0403159 A1 Dec. 30, 2021

(30) Foreign Application Priority Data
Oct. 18, 2018 (IN) .............................. 201811039597

(51) Int. Cl.
*B64C 39/02* (2023.01)
*G05B 13/02* (2006.01)
(Continued)

(52) U.S. Cl.
CPC ........ *B64C 39/024* (2013.01); *G05B 13/0265* (2013.01); *G05D 1/0005* (2013.01);
(Continued)

(58) Field of Classification Search
None
See application file for complete search history.

(56) References Cited

U.S. PATENT DOCUMENTS

2017/0123418 A1* 5/2017 Erickson .............. G08G 5/0082
2017/0229029 A1* 8/2017 Klinger ................ H04B 7/0617
(Continued)

FOREIGN PATENT DOCUMENTS

CN 101286071 B * 11/2010
CN 103777640 A * 5/2014
(Continued)

OTHER PUBLICATIONS

Hafez, Ahmed Taimour et al., "Fault-Tolerant Control for Cooperative Unmanned Aerial Vehicles Formation Via Fuzzy Logic," Jul. 4, 2016, IEEE, 2016 International Conference on Unmanned Aircraft Systems (ICUAS), pp. 1261-1266 (Year: 2016).*
(Continued)

Primary Examiner — Aniss Chad
Assistant Examiner — Madison R. Inserra
(74) Attorney, Agent, or Firm — Sage Patent Group

(57) ABSTRACT

A method manages a group of Unmanned Aerial Vehicles (UAVs) operable to fly in a formation. Each UAV is programmed with a task to be performed by the UAV. The method is performed in a controller UAV of the group and comprises receiving UAV status information from UAVs in the group, obtaining information on a current formation of the group and combining the received UAV status information with the information on current group formation to form a representation of a first state of the group. A machine learning model is used to predict, based on the first state of the group, an optimal formation transition to a new formation and to instruct the UAVs in the group to perform the predicted optimal formation transition, which is a transition
(Continued)

to a formation that will minimise predicted total energy consumption for all UAVs in the group to complete their tasks.

19 Claims, 14 Drawing Sheets

(51) Int. Cl.
  *G05D 1/00* (2024.01)
  *G08G 5/00* (2006.01)
  *G06N 3/008* (2023.01)
  *G06N 5/043* (2023.01)
  *G06N 20/00* (2019.01)

(52) U.S. Cl.
  CPC ........... *G05D 1/104* (2013.01); *G08G 5/0008* (2013.01); *G08G 5/0034* (2013.01); *G08G 5/0078* (2013.01); *B64U 2201/20* (2023.01)

(56) References Cited

U.S. PATENT DOCUMENTS

| | | | | |
|---|---|---|---|---|
| 2017/0293307 | A1* | 10/2017 | Frolov | B64D 43/02 |
| 2018/0074520 | A1 | 3/2018 | Liu et al. | |
| 2019/0107846 | A1* | 4/2019 | Roy | G08G 5/04 |
| 2019/0315482 | A1* | 10/2019 | Gu | G05D 1/104 |

FOREIGN PATENT DOCUMENTS

| | | | | |
|---|---|---|---|---|
| CN | 107632614 A | * | 1/2018 | |
| CN | 108427433 A | * | 8/2018 | ............. G05D 1/104 |
| WO | 2018150332 A1 | | 8/2018 | |

OTHER PUBLICATIONS

Hattenberger, Gautier et al., "Planning and control for Unmanned Air Vehicle formation flight," Jan. 15, 2007, IEEE, 2006 IEEE/RSJ International Conference on Intelligent Robots and Systems, pp. 5931-5936 (Year: 2007).*

Duan, Hai-Bin, et al., "Optimal Formation Reconfiguration Control of Multiple UCAV's Using Improved Particle Swarm Optimization", Journal of Bionic Engineering, 2008, 1-8.

Wang, Jianan, et al., "Integrated Optimal formation Control of Multiple Unmanned Aerial Vehicles", IEEE Transactions on Control Systems Technology, vol. 21, No. 5, Sep. 2013, 1-4.

Bergwerff, Gerben, "Using Machine Learning Techniques for Autonomous Planning and Navigation with Groups of Unmanned Vehicles", Master's Thesis: Department of Artificial Intelligence, University of Groningen, The Netherlands, Jul. 19, 2016, pp. 1-63.

* cited by examiner

9.5 kWh 9 kWh 9.6 kWh 9.7 kWh

FORMATION FLIGHT OF UNMANNED AERIAL VEHICLES

TECHNICAL FIELD

The present disclosure relates to a method for managing a group of Unmanned Aerial Vehicles (UAVs) operable to fly in a formation. The present disclosure also relates to a method for operating a UAV and to a method for training a machine learning model for use in managing a group of UAVs operable to fly in a formation. The present disclosure also relates to a UAV and to a computer program and a computer program product configured, when run on a computer to carry out methods for managing and operating a UAV and for training a Machen learning model.

BACKGROUND

Unmanned Aerial Vehicles (UAVs), also referred to as drones, are increasingly used in the fields of logistics, e-commerce and telecommunications. Drones may be preferred to alternative means for transport of equipment or delivery of a payload in a range of situations, including in highly congested urban areas, which may be susceptible to traffic delays, and in remote locations, which may be difficult or expensive to access using alternative delivery methods. In order to optimise delivery timelines, multiple drones flying to destinations in a given direction from a delivery hub, or within a given radius of each other, may be programmed to travel a majority of their delivery distance together in a pack or flock, only separating from the flock to attain their destinations in the "last mile".

Minimising energy expenditure of a drone during flight is desirable in order to maximize the operational radius of the drone, to minimize cost per delivery distance associated with the drone and to reduce the overall energy footprint of the drone.

SUMMARY OF INVENTION

It is an aim of the present disclosure to provide a method, apparatus and computer readable medium which at least partially address one or more of the challenges discussed above.

According to a first aspect of the present disclosure, there is provided a method for managing a group of Unmanned Aerial Vehicles (UAVs) operable to fly in a formation, wherein a formation comprises a specified position for each UAV with respect to other UAVs in the group and a direction of flight, and wherein each UAV is programmed with a task to be performed by the UAV. The method, performed in a controller UAV of the group, comprises receiving UAV status information from UAVs in the group, wherein UAV status information comprises, for a UAV, information on at least one of the programmed task of the UAV, UAV operation, and/or UAV external environment. The method further comprises obtaining information on a current formation of the group and combining the received UAV status information with the information on current group formation to form a representation of a first state of the group. The method further comprises using a trained machine learning model to predict, on the basis of the first state of the group, an optimal formation transition to a new formation, wherein an optimal formation transition is a transition to a formation that will minimise predicted total energy consumption for all UAVs in the group to complete their tasks. The method further comprises instructing the UAVs in the group to perform the predicted optimal formation transition.

According to examples of the present disclosure, the method may further comprise an initial step of being configured as controller UAV for the group of UAVs. The configuration may be performed by an apparatus or function at a controller station or hub and may be managed by an operator or manager of the drone.

According to examples of the present disclosure, a task to be performed by a UAV may comprise a destination to which the UAV must fly and a minimum residual amount of energy that must remain in the UAV on arrival at the destination.

According to examples of the present disclosure, completing a task by a UAV may comprise the UAV arriving at the destination specified in the task with at least the required minimum residual amount of energy specified in the task and respecting any additional conditions specified in the task.

According to examples of the present disclosure, information on the programmed task of the UAV may comprise at least one of distance to destination and/or minimum required residual energy on arrival.

According to examples of the present disclosure, information on UAV operation may comprise at least one of rate of energy usage per distance travelled by the UAV, energy remaining in the UAV, and/or UAV internal battery temperature.

According to examples of the present disclosure, information on UAV external environment may comprise ambient environment characteristics as sensed at the UAV.

According to examples of the present disclosure, ambient environment characteristics may include air temperature, air pressure, humidity, wind speed and/or wind direction.

According to examples of the present disclosure, obtaining information on a current formation of a group may comprise retrieving a current group formation from a memory or receiving positional information from UAVs and assembling information on a current formation from the received positional information.

According to examples of the present disclosure, the method may further comprise receiving updated UAV status information from UAVs in the group, and combining the updated UAV status information with information on the formation of the group following the formation transition, to form a representation of a second state of the group.

According to examples of the present disclosure, the method may further comprise calculating a value of a reward function for the performed formation transition, wherein the reward function is calculated on the basis of inputs including at least predicted energy consumption for all UAVs in the group to complete their tasks in the first state, predicted energy consumption for all UAVs in the group to complete their tasks in the second state, and compliance with constraints of programmed UAV tasks.

According to examples of the present disclosure, constraints of programmed UAV tasks may include task specific constraints, such as task destination and required residual power on arrival at destination, and constraints applicable to multiple tasks, including collision avoidance, flight path restrictions, respect of operational limits for UAV components etc.

According to examples of the present disclosure, calculating a value of the reward function for the performed formation transition may comprise performing at least one of incrementing or decrementing the value of the reward function according to the inputs.

According to examples of the present disclosure, an amount by which the value of the reward function is incremented and/or decremented may vary between inputs and according to a value of a particular input.

According to examples of the present disclosure, calculating a value of the reward function for the performed formation transition may comprise incrementing the value of the reward function if the predicted energy consumption for all UAVs in the group to complete their tasks in the second state is less than the predicted energy consumption for all UAVs in the group to complete their tasks in the first state.

According to examples of the present disclosure, calculating a value of the reward function for the performed formation transition may comprise decrementing the value of the reward function if the predicted energy consumption for all UAVs in the group to complete their tasks in the second state is greater than the predicted energy consumption for all UAVs in the group to complete their tasks in the first state.

According to examples of the present disclosure, calculating a value of the reward function for the performed formation transition may comprise decrementing the value of the reward function if, when the UAVs are in the second state, a constraint of a programmed UAV task will not be complied with.

According to examples of the present disclosure, failure to comply with a constraint of a programmed UAV task may include a UAV being unable to arrive at its destination owing to a collision or insufficient energy to reach its destination, a UAV arriving at its destination with less than the required minimum residual energy, violation of flight path restrictions, non-respect of operational limits for UAV components etc.

According to examples of the present disclosure, the reward function may be further calculated on the basis of movement of individual UAVs between the formation of the first state and the formation after the formation transition.

According to examples of the present disclosure, calculating a value of the reward function for the performed formation transition may comprise decrementing the value of the reward function for each UAV that is required to change position in order to accomplish the formation transition. An amount by which the value is decremented may be dependent upon a nature of the position change and in some examples may be small compared to amounts by which the value is incremented or decremented as a consequence of other inputs, such that the impact of the position change input on the value of the reward function is less that the impact of other inputs.

According to examples of the present disclosure, the method may further comprise combining the representation of the first state, the performed formation transition, the representation of the second state and the calculated value of the reward function into a transition experience record and storing the transition experience record in a memory.

According to examples of the present disclosure, in later iterations of the method, obtaining information on a current formation of the group may comprise retrieving a preceding transition experience record from a memory and setting the formation after the formation transition as the current formation of the group.

According to examples of the present disclosure, using a trained machine learning model to predict, on the basis of the first state of the group, an optimal formation transition to a new formation may comprise inputting to the trained machine learning model the representation of the first state, predicting, by the model, a value parameter associated with different formation transitions from the formation of the first state to possible new formations, and selecting, by the model, the formation transition having the highest predicted value parameter as the predicted optimal formation transition.

According to examples of the present disclosure, the value parameter associated with a formation transition may comprise the value of a reward function for the formation transition, wherein the reward function is based on predicted energy consumption for all UAVs in the group to complete their tasks in the first state, predicted energy consumption for all UAVs in the group to complete their tasks in a second state after the formation transition and compliance with constraints of programmed UAV tasks.

According to examples of the present disclosure, the reward function may be further based in movement of individual UAVs between the formation of the first state and the formation after the formation transition.

According to examples of the present disclosure, receiving UAV status information from UAVs in the group may comprise receiving the UAV status information on a periodic basis, and the method may further comprise checking for occurrence of a trigger condition from a predetermined group of trigger conditions, and waiting to perform subsequent steps of the method until occurrence of a trigger condition.

According to examples of the present disclosure, the predetermined group of trigger conditions may comprise at least one of a change in the composition of the group of UAVs, a parameter of a UAV exceeding a predetermined operational threshold, a change in UAV external environment for UAVs in the group that exceeds a variation threshold.

According to examples of the present disclosure, a parameter exceeding an operational threshold may be notified by the UAV concerned or may be determined by the controller UAV on the basis of the periodically received UAV status information. According to examples of the present disclosure, a change in UAV external environment may be measured against the environment at the time that the group transitioned into a current formation, and the change in environment may be sudden or progressive. Thus in one example, a significant change may be experienced between a parameter in one set of status data and the next (such as the beginning of a heavy rain shower etc.). In another example a gradual change in a parameter may be experienced over several status data reporting periods, such as a gradual change in wind direction. According to examples of the present disclosure, by comparing the latest status data to that at the time that the group transitioned into a current formation, a gradual change which, over time, results in a change that is over the variation threshold may be detected.

According to examples of the present disclosure, the predetermined group of trigger conditions may further comprise a timer.

According to examples of the present disclosure, the method may further comprise determining that a parameter of a UAV has exceeded a predetermined operational threshold, and instructing the UAV to move from its current position to a new position in a current formation of the group, the new position being a position in which energy consumption of the UAV will be reduced compared to energy consumption in the current position of the UAV.

According to examples of the present disclosure, a UAV exceeding a threshold for an operating parameter (for example an overheating internal battery) may therefore trigger a complete iteration of the method and transition to a new formation or may simply trigger a reshuffle in a current formation, moving the affected UAV to a new position in an otherwise maintained formation. Moving an affected UAV to a new position may comprise performing a direct swap with a UAV in a different position or may comprise a shuffling of UAVs, in which the positions of several UAVs are changed to best manage the energy requirements of the UAVs in the formation.

According to examples of the present disclosure, the method may further comprise selecting an initial formation for the group on the basis of initial UAV status information and an experience replay stored in a memory of the controller UAV. According to examples of the present disclosure, an experience replay may comprise a plurality of transition experience records for groups of UAVs, and a transition experience record may comprise, for a group of UAVs, a representation of a first state of the group including a formation of the group and UAV status information, a formation transition from the formation of the first state to a new formation, a representation of a second state of the group after the formation transition and a calculated value of a reward function. The reward function may be calculated on the basis of inputs including at least predicted energy consumption for all UAVs in the group to complete their tasks in the first state, predicted energy consumption for all UAVs in the group to complete their tasks in the second state, and compliance with constraints of programmed UAV tasks.

According to examples of the present disclosure, the method may further comprise determining that the controller UAV should cease to be the controller UAV for the group, selecting a new controller UAV from among the remaining UAVs in the group, and notifying UAVs in the group of the identity of the new controller UAV. Determining that the controller UAV should cease to be the controller UAV for the group may comprise determining that the controller UAV should leave the group, for example to arrive at its destination. In other examples, determining that the controller UAV should cease to be the controller UAV for the group may comprise determining that the controller UAV should cease to be controller UAV because of a malfunction, or because the controller UAV no longer fulfils criteria used to select a controller UAV for the group.

According to examples of the present disclosure, selecting a new controller UAV from among the remaining UAVs in the group may comprise selecting on the basis of at least one of programmed tasks of the UAVs, and energy remaining in the UAVs.

According to one example of the present disclosure, the controller UAV may select as a new controller UAV the UAV having the greatest distance still to travel, in order to minimise changes in controller drone. In another example, distance still to travel may be balanced against an energy assessment for the drone, including a comparison, based on energy left in the drone, distance still to travel and rate of energy consumption, between predicted energy that will remain in the UAV at its destination and minimum residual energy required in the UAV at its destination according to tis programmed task.

According to another aspect of the present disclosure, there is provided a method for operating an Unmanned Aerial Vehicle (UAV) wherein the UAV is programmed with a task to be performed by the UAV and wherein the UAV is a member of a group of UAVs that are operable to fly in a formation, a formation comprising a specified position for each UAV with respect to other UAVs in the group and a direction of flight. The method, performed in the UAV, comprises reporting UAV status information to a controller UAV of the group, wherein UAV status information comprises, for the UAV, information on at least one of the programmed task of the UAV, UAV operation, and/or UAV external environment. The method further comprises receiving from the controller UAV an instruction to transition to a new position with respect to other UAVs in the group and a direction of flight, and transitioning to the new position.

According to examples of the present disclosure, the method may in some examples further comprise an initial step of being configured with an identity of the controller UAV for the group of UAVs.

According to examples of the present disclosure, a task to be performed by the UAV may comprise a destination to which the UAV must fly and a minimum residual amount of energy that must remain in the UAV on arrival at the destination.

According to examples of the present disclosure, information on the programmed task of the UAV may comprise at least one of distance to destination and/or minimum required residual energy on arrival.

According to examples of the present disclosure, information on UAV operation may comprise at least one of rate of energy usage per distance travelled by the UAV, energy remaining in the UAV and/or UAV internal battery temperature.

According to examples of the present disclosure, information on UAV external environment may comprise ambient environment characteristics as sensed at the UAV.

According to examples of the present disclosure, the method may further comprise reporting updated UAV status information to the controller UAV following transitioning to the new position.

According to examples of the present disclosure, the method may further comprise determining that a parameter of the UAV has exceeded a predetermined operational threshold, and reporting to the controller UAV that a parameter of the UAV has exceeded a predetermined operational threshold.

According to examples of the present disclosure, the method may further comprise reporting UAV status information to a controller UAV of the group on a periodic basis.

According to examples of the present disclosure, the method may further comprise determining on the basis of the programmed task of the UAV that the UAV should leave the group of UAVs, and informing the controller UAV that the UAV is leaving the group of UAVs.

According to examples of the present disclosure, the method may further comprise receiving a notification from the controller UAV of an identity of a new controller UAV for the group, and updating a UAV configuration to reflect the identity of the new controller UAV.

According to examples of the present disclosure, the method may further comprise determining that the identity of the new controller is the UAVs own identity, and performing the steps of any one of the preceding aspects or examples of the present disclosure.

According to another aspect of the present disclosure, there is provided a method for training a machine learning model for use in managing a group of Unmanned Aerial Vehicles (UAVs) operable to fly in a formation, wherein a formation comprises a specified position for each UAV with respect to other UAVs in the group and a direction of flight, and wherein each UAV is programmed with a task to be performed by the UAV. The method comprises assembling an experience replay from at least one of real time or simulated flights of groups of UAVs, and causing the machine learning model to execute a reinforcement learning algorithm on the experience replay. The experience replay comprises a plurality of transition experience records for groups of UAVs and a transition experience record comprises, for a group of UAVs, a representation of a first state of the group including a formation of the group and UAV status information, a formation transition from the formation of the first state to a new formation, a representation of a second state of the group after the formation transition, and a calculated value of a reward function. The reward function is calculated on the basis of inputs including at least predicted energy consumption for all UAVs in the group to complete their tasks in the first state, predicted energy consumption for all UAVs in the group to complete their tasks in the second state, and compliance with constraints of programmed UAV tasks.

According to examples of the present disclosure, causing the machine learning model to execute a reinforcement learning algorithm on the experience replay may comprise causing the machine learning model to trial selection of different formation transitions from different states represented in the experience replay, and to learn from the experience replay how to predict a value parameter associated with different formation transitions from different states, wherein the value parameter comprises the value of the reward function represented in the experience replay.

According to examples of the present disclosure, the method may further comprise updating the experience replay with transition experience records from completed flights of groups of UAV, and causing the machine learning model to execute a reinforcement learning algorithm on the updated experience replay.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure According to another aspect of the present disclosure, there is provided an Unmanned Aerial Vehicle (UAV) operable to fly in a formation with a group of UAVs and to operate as a controller UAV of the group of UAVs, wherein a formation comprises a specified position for each UAV with respect to other UAVs in the group and a direction of flight, and wherein each UAV of the group is programmed with a task to be performed by that UAV. The UAV comprises a processor and a memory, the memory containing instructions executable by the processor such that the UAV is operable to receive UAV status information from UAVs in the group, wherein UAV status information comprises, for a UAV, information on at least one of the programmed task of the UAV, UAV operation, and/or UAV external environment. The UAV is further operable to obtain information on a current formation of the group, combine the received UAV status information with the information on current group formation to form a representation of a first state of the group and use a trained machine learning model to predict, on the basis of the first state of the group, an optimal formation transition to a new formation, wherein an optimal formation transition is a transition to a formation that will minimise predicted total energy consumption for all UAVs in the group to complete their tasks. The UAV is further operable to instruct the UAVs in the group to perform the predicted optimal formation transition.

According to examples of the present disclosure, the UAV may be further operable to carry out a method according to any one of the preceding aspects or examples of the present disclosure.

According to another aspect of the present disclosure, there is provided an Unmanned Aerial Vehicle (UAV) operable to fly in a formation with a group of UAVs and to operate as a controller UAV of the group of UAVs, wherein a formation comprises a specified position for each UAV with respect to other UAVs in the group and a direction of flight, and wherein each UAV of the group is programmed with a task to be performed by that UAV. The UAV is adapted to receive UAV status information from UAVs in the group, wherein UAV status information comprises, for a UAV, information on at least one of the programmed task of the UAV, UAV operation, and/or UAV external environment. The UAV is further adapted to obtain information on a current formation of the group, combine the received UAV status information with the information on current group formation to form a representation of a first state of the group, and use a trained machine learning model to predict, on the basis of the first state of the group, an optimal formation transition to a new formation, wherein an optimal formation transition is a transition to a formation that will minimise predicted total energy consumption for all UAVs in the group to complete their tasks. The UAV is further adapted to instruct the UAVs in the group to perform the predicted optimal formation transition.

According to examples of the present disclosure, the UAV may be further adapted to carry out a method according to any one of the preceding aspects or examples of the present disclosure.

According to another aspect of the present disclosure, there is provided an Unmanned Aerial Vehicle (UAV) operable to fly in a formation with a group of UAVs, wherein the UAV is programmed with a task to be performed by the UAV and wherein the UAV is a member of a group of UAVs that are operable to fly in a formation, a formation comprising a specified position for each UAV with respect to other UAVs in the group and a direction of flight. The UAV comprises a processor and a memory, the memory containing instructions executable by the processor such that the UAV is operable to report UAV status information to a controller UAV of the group, wherein UAV status information comprises, for the UAV, information on at least one of the programmed task of the UAV, UAV operation, and/or UAV external environment. The UAV is further operable to receive from the controller UAV an instruction to transition to a new position with respect to other UAVs in the group and a direction of flight, and transition to the new position.

According to examples of the present disclosure, the UAV may be further operable to carry out a method according to any one of the preceding aspects or examples of the present disclosure.

According to another aspect of the present disclosure, there is provided an Unmanned Aerial Vehicle (UAV) operable to fly in a formation with a group of UAVs, wherein the UAV is programmed with a task to be performed by the UAV and wherein the UAV is a member of a group of UAVs that are operable to fly in a formation, a formation comprising a specified position for each UAV with respect to other UAVs in the group and a direction of flight. The UAV is adapted to report UAV status information to a controller UAV of the group, wherein UAV status information comprises, for the UAV, information on at least one of the programmed task of the UAV, UAV operation, and/or UAV external environment. The UAV is further adapted to receive from the controller UAV an instruction to transition to a new position with respect to other UAVs in the group and a direction of flight, and transition to the new position.

According to examples of the present disclosure, the UAV may be further adapted to carry out a method according to any one of the preceding aspects or examples of the present disclosure.

According to another aspect of the present disclosure, there is provided apparatus for training a machine learning model for use in managing a group of Unmanned Aerial Vehicles (UAVs) operable to fly in a formation, wherein a formation comprises a specified position for each UAV with respect to other UAVs in the group and a direction of flight, and wherein each UAV is programmed with a task to be performed by the UAV. The apparatus comprises a processor and a memory, the memory containing instructions executable by the processor such that the apparatus is operable to assemble an experience replay from at least one of real time or simulated flights of groups of UAVs and cause the machine learning model to execute a reinforcement learning algorithm on the experience replay. The experience replay comprises a plurality of transition experience records for groups of UAVs and a transition experience record comprises, for a group of UAVs, a representation of a first state of the group including a formation of the group and UAV status information, a formation transition from the formation of the first state to a new formation, a representation of a second state of the group after the formation transition, and a calculated value of a reward function. The reward function is calculated on the basis of at least: predicted energy consumption for all UAVs in the group to complete their tasks in the first state, predicted energy consumption for all UAVs in the group to complete their tasks in the second state, and compliance with constraints of programmed UAV tasks.

According to examples of the present disclosure, the apparatus may be further operable to carry out a method according to any one of the preceding aspects or examples of the present disclosure.

According to another aspect of the present disclosure, there is provided apparatus for training a machine learning model for use in managing a group of Unmanned Aerial Vehicles (UAVs) operable to fly in a formation, wherein a formation comprises a specified position for each UAV with respect to other UAVs in the group and a direction of flight, and wherein each UAV is programmed with a task to be performed by the UAV. The apparatus is adapted to assemble an experience replay from at least one of real time or simulated flights of groups of UAVs and cause the machine learning model to execute a reinforcement learning algorithm on the experience replay. The experience replay comprises a plurality of transition experience records for groups of UAVs and a transition experience record comprises, for a group of UAVs, a representation of a first state of the group including a formation of the group and UAV status information, a formation transition from the formation of the first state to a new formation, a representation of a second state of the group after the formation transition, and a calculated value of a reward function. The reward function is calculated on the basis of at least predicted energy consumption for all UAVs in the group to complete their tasks in the first state, predicted energy consumption for all UAVs in the group to complete their tasks in the second state, and compliance with constraints of programmed UAV tasks.

According to examples of the present disclosure, the apparatus may be further adapted to carry out a method according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings in which:

FIGS. 7 and 8 illustrate alternative formations for the group of UAVs of FIG. 6;

DETAILED DESCRIPTION

Aspects of the present disclosure provide a method for managing a group of UAVs, according to which an optimal formation transition from a current formation of the group to a new formation of the group may be predicted using a machine learning model. The optimal formation transition may be a transition to a formation that will minimise predicted total energy consumption for all UAVs in the group to complete their tasks. The optimal formation transition may be predicted on the basis of the current group formation and UAV status information for UAVs in the group. The UAV status information may include, for a given UAV, information on a programmed task of the UAV, information on UAV operation and/or information on UAV external environment.

Aspects of the present disclosure may thus reduce the energy requirements of a group of UAVs by exploiting energy advantages that may be offered by different flying formations. Both the external environment through which the UAVs are flying and a status of individual UAVs may be taken into account to predict an optimal formation transition. In this way, an energy efficient formation for given weather conditions may be adopted, and UAVs may be assigned to individual positions within the formation in accordance with their current energy status, energy required to complete their programmed task etc. UAVs having greater distances to travel may thus benefit from more energy efficient positions within a formation to enable them to increase their maximum flight distance. In addition, the overall energy expenditure of the group may be minimised through the selection of an energy efficient formation with respect to current weather conditions. UAVs may rotate through different positions in a formation to share the energy cost of flying in formation positions requiring the greatest energy expenditure.

FIGS. 1 to 4 are flow charts illustrating process steps in methods that may be carried out for managing a group of UAVs, operating a UAV and training a machine learning model. The individual steps of the methods in FIGS. 1 to 4 are discussed below. Example implementations of the methods are then discussed with reference to FIGS. 5 to 14.

Figure 1:
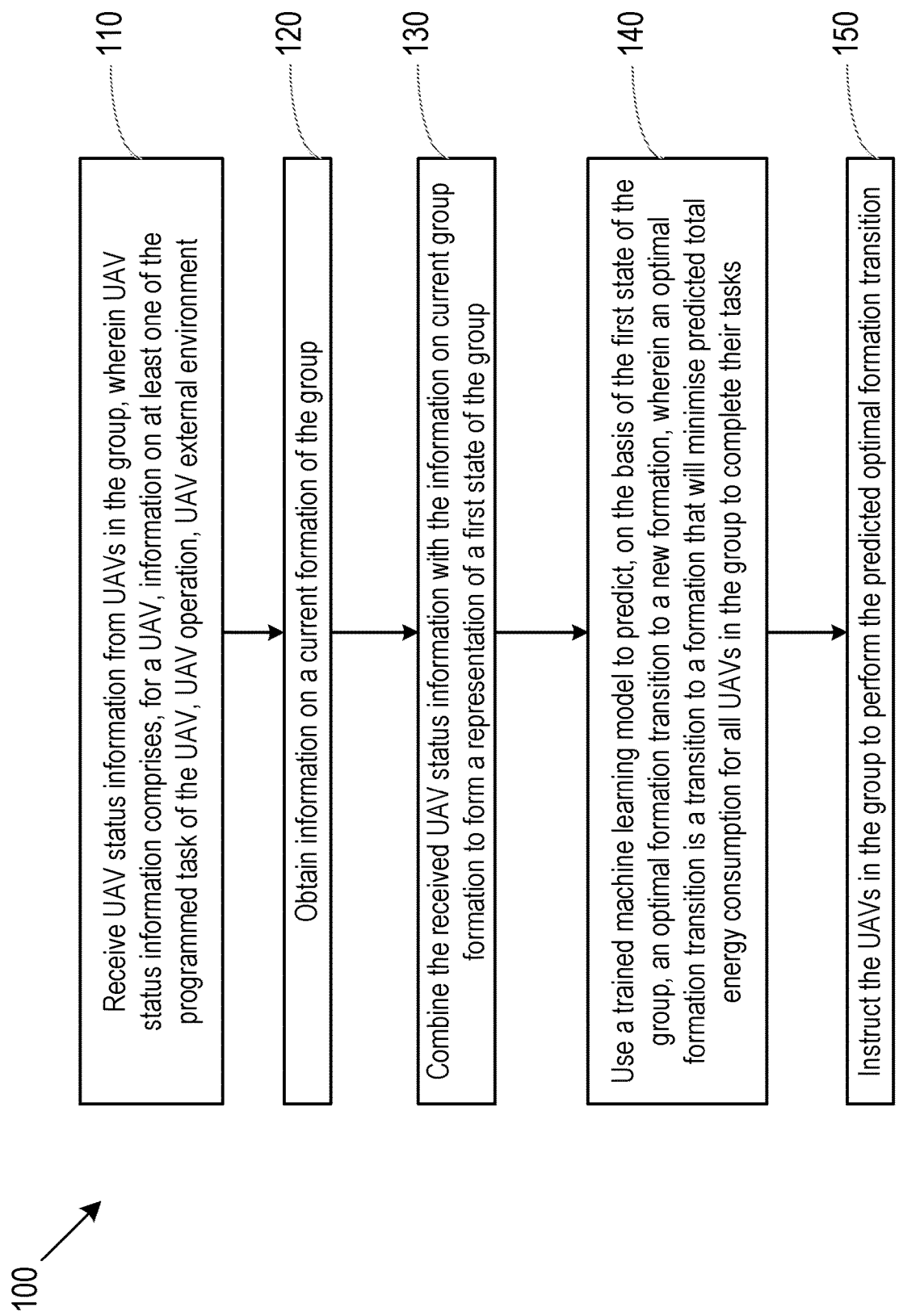
FIG. 1 is a flow chart illustrating process steps in a method for managing group of UAVs.

FIG. 1 illustrates process steps in a method 100 for managing a group of UAVs operable to fly in a formation. For the purposes of the method 100, a formation comprises a specified position for each UAV with respect to other UAVs in the group and a direction of flight. Each UAV is programmed with a task to be performed by the UAV and the method is performed by a controller UAV of the group. Referring to FIG. 1, the method comprises, in a first step 110, receiving UAV status information from UAVs in the group. UAV status information comprises, for a UAV, information on at least one of the programmed task of the UAV, UAV operation and/or UAV external environment. The method then comprises, in step 120, obtaining information on a current formation of the group and, in step 130, combining the received UAV status information with the information on current group formation to form a representation of a first state of the group. The method then comprises, in step 140, using a trained machine learning model to predict, on the basis of the first state of the group, an optimal formation transition to a new formation, an optimal formation transition being a transition to a formation that will minimize predicted total energy consumption for all UAVs in the group to complete their tasks. The method then comprises, in step 150, instructing the UAVs in the group to perform the predicted optimal formation transition.

Figure 2A:
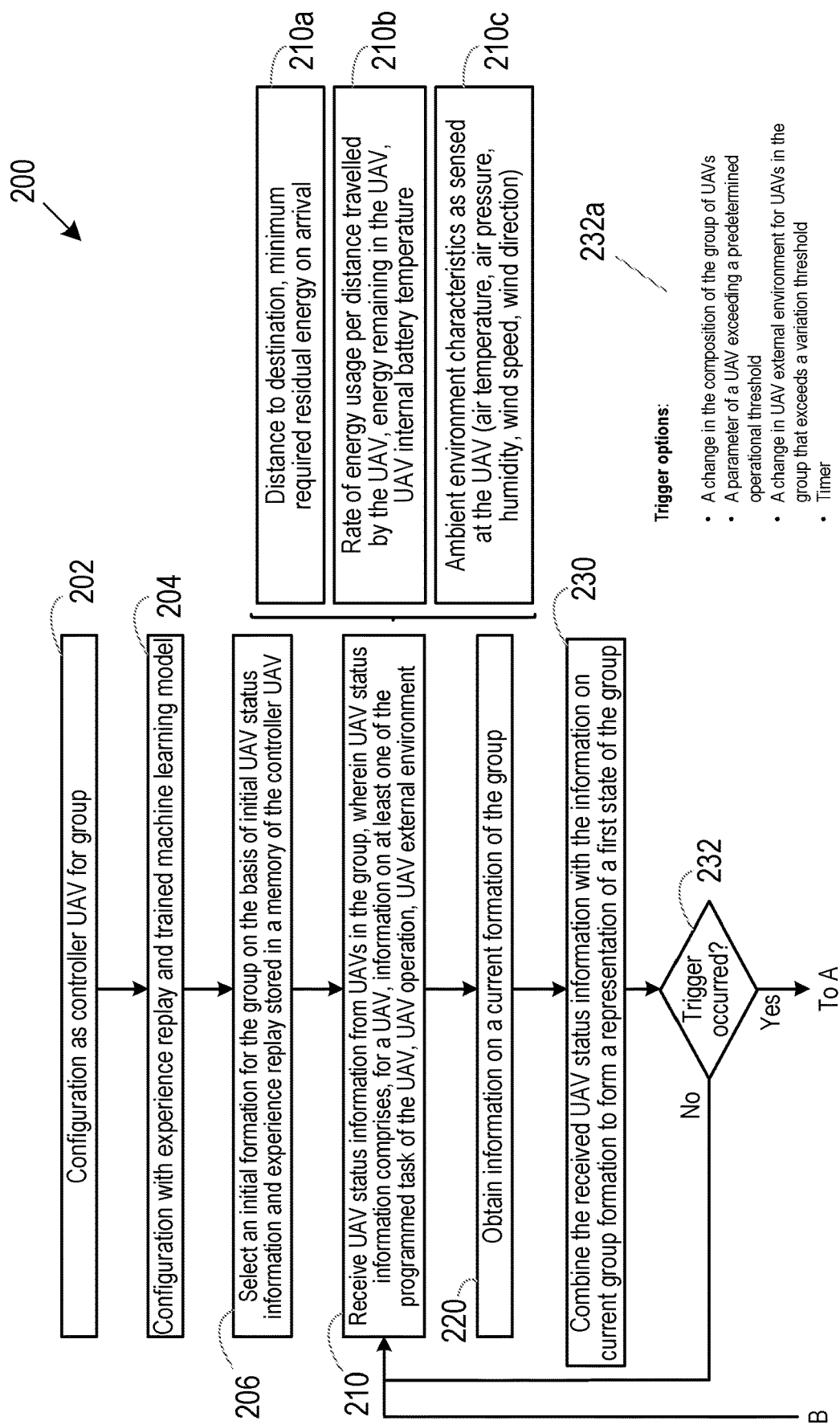
FIGS. 2a to 2c are flow charts illustrating another example of a method for managing group of UAVs.
Figure 2B:
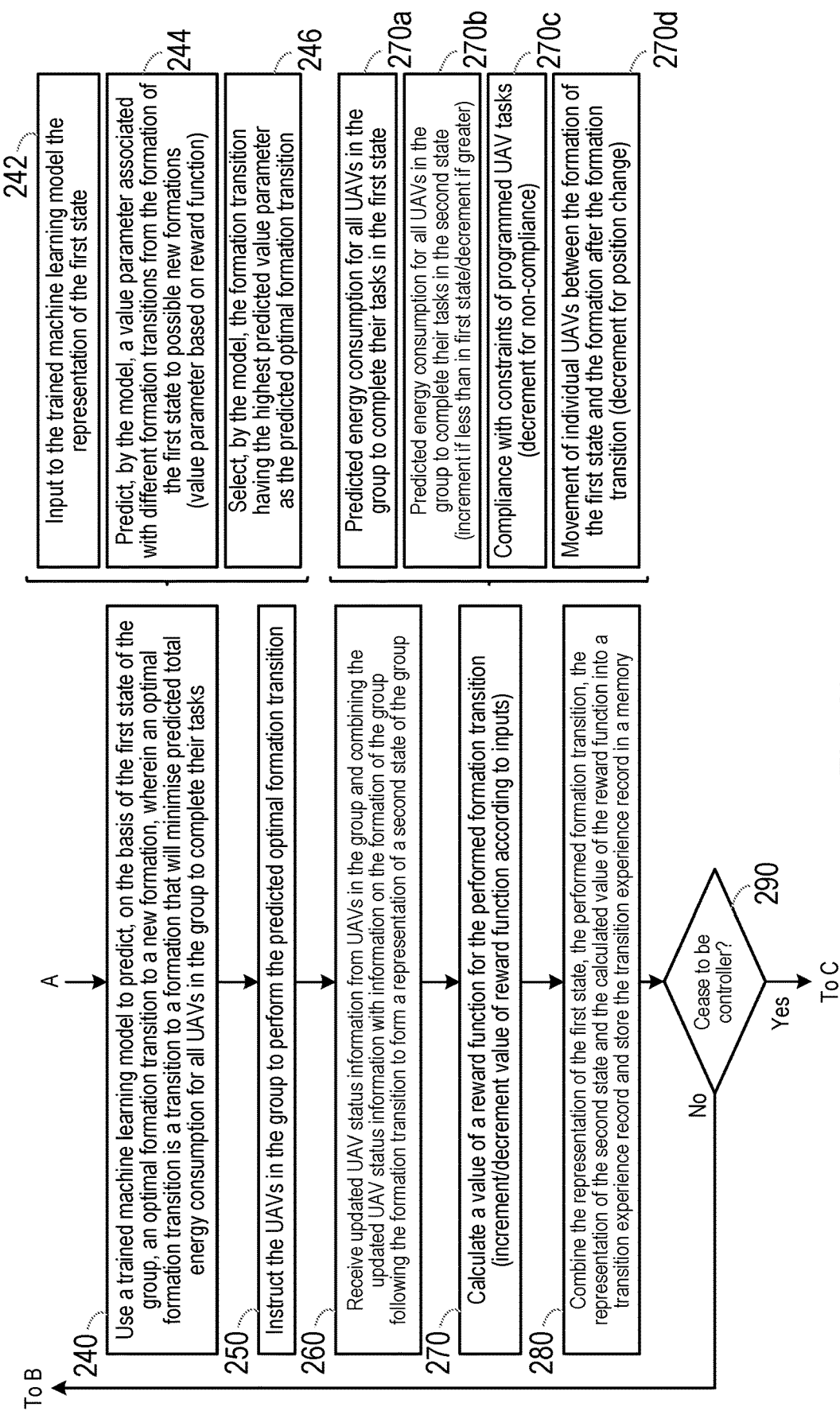
Figure 2C:
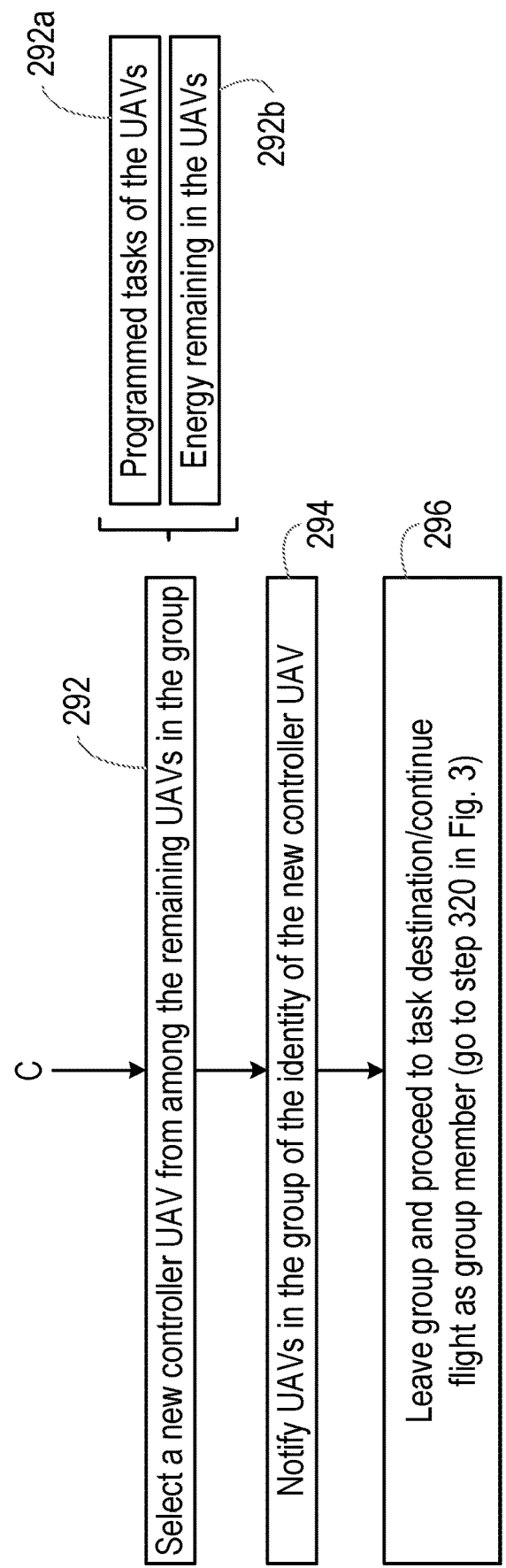

FIGS. 2a to 2c illustrate process steps in another example of method 200 for managing a group of UAVs operable to fly in a formation. As for the method 100 above, a formation comprises a specified position for each UAV with respect to other UAVs in the group and a direction of flight. Each UAV is programmed with a task to be performed by the UAV and the method is performed by a controller UAV of the group. The steps of the method 200 illustrate one example way in which the steps of the method 100 may be implemented and supplemented to achieve the above discussed and additional functionality. Referring initially to FIG. 2a, in a first step 202, the controller UAV is configured as controller UAV for the group. This configuration may be performed by an apparatus or function acting on behalf of an operator or administrator for the controller UAV and/or for all UAVs in the group. The configuration as controller UAV may take place at a control station or hub before takeoff of the UAV or may take place during flight. As discussed in greater detail below, the role of controller UAV may be passed to a different UAV in the group during flight, if for example the original controller UAV is required to cease being controller UAV, for example to drop out of the group in order to complete its task or following a malfunction. In other examples, a UAV may initially commence a flight alone, and may be joined by additional UAVs during flight, thus forming a group of UAVs and allowing for the possibility of formation flight. In such examples, the UAV may be configured as default controller UAV for the future group that will be formed during flight. The UAV may thus be configured as controller UAV before takeoff but only commence the actions of controller UAV when joined by other UAVs during flight. In still further examples, the UAV may be configured as controller UAV for the newly formed group when joined by the additional UAVs. In such examples, the configuration may be performed by the UAV itself, assuming the role of controller for the newly formed group. This self-configuration may follow an information exchange with the other UAVs in the newly formed group, for example to establish which UAV should assume the role of controller on the basis of conditions including distance to destination, remaining energy etc. The possibility for self-configuration following an information exchange may allow for the ad-hoc formation of groups during flight.

Referring still to FIG. 2a, the controller UAV is also configured with its task to be performed and with an experience replay and trained machine learning model in step 204. The experience replay and machine learning model are discussed in greater detail below. Either before or after takeoff of the UAV, the controller UAV selects, in step 206, an initial flying formation for the group. The initial flying formation is selected on the basis of initial UAV status information and the experience replay stored in a memory of the controller UAV. If the initial flying formation is selected before takeoff, the initial flying formation may be selected on the basis of the experience replay alone.

In step 210, the controller drone receives UAV status information for UAVs in the group. The UAV status information may be sent to the controller UAV by some or all UAVs in the group, and may be received at the controller UAV on a periodic basis. The UAV status information includes, for a given UAV, information on at least one of the programmed task of the UAV, UAV operation and/or UAV external environment. Each of these classes of UAV status information is illustrated in further detail in steps 210a to 210c. As shown at 210a, the information on the programmed task of the UAV may include remaining distance to the UAV's destination and the minimum required residual energy on arrival specified in the programmed task. As shown at 210b, the information on UAV operation may comprise at least one of rate of energy usage per distance travelled by the UAV, energy remaining in the UAV and/or UAV internal battery temperature. As shown at 210c, the information on UAV external environment may comprise ambient environment characteristics as sensed at the UAV. These characteristics may include air temperature, air pressure, humidity, wind speed and wind direction.

In step 220, the controller UAV obtains information on a current formation of the group. The information may be obtained from a memory of the controller UAV, or on the basis of positional information sent to the controller UAV by UAVs in the group. In step 230, the controller UAV combines the received UAV status information with the information on current group formation to form a representation of a first state of the group. The state representation may thus encompass factors external to the UAVs in the form of environmental data, and internal to the UAVs, in the form of data relating to UAV task and operation.

In step 232, the controller UAV checks whether or not a trigger condition has occurred. Options for the trigger condition are illustrated at 232a and include a change in the composition of the group of UAVs, for example a UAV leaving the group or joining the group, a parameter of a UAV exceeding a predetermined operational threshold, a change in UAV external environment for UAVs in the group that exceeds a variation threshold and a timer. The different trigger options may collectively ensure that a prediction of an optimal formation transition is carried out under a range of circumstances which may indicate that the current formation is no longer optimal from the point of view of overall energy expenditure of the group or completion of programmed task by all group members. A change in the composition of the group may mean either that a position in the current formation is no longer filled, or that the formation no longer accommodates all group members. In either case, it is likely that the current formation is no longer optimal, and that a prediction of an optimal formation transition should be triggered. If a parameter of a UAV exceeds an operational threshold, this may compromise functioning of the UAV and therefore should be addressed to place the UAV in a formation position that will enable the parameter to return to an operational window. This may for example include an overheating internal battery, meaning the UAV concerned should be placed in a position requiring less energy expenditure. A parameter exceeding an operational threshold may be notified by the UAV concerned or may be determined by the controller UAV on the basis of the received UAV status information.

A change in UAV external environment may be measured against the environment at the time that the group transitioned into a current formation, and the change in environment may be sudden or progressive. Thus in one example, a significant change may be experienced between a parameter in one set of status data and the next (such as the beginning of a heavy rain shower etc.). In another example a gradual change in a parameter may be experienced over several status data reporting periods, such as a gradual change in wind direction. By comparing the latest status data to that at the time that the group transitioned into a current formation, a gradual change that over time results in a change that is over the variation threshold may be detected. The variation threshold may be selected by an operator and its value may be such as to trigger a prediction of an optimal formation transition if the change in external environment is sufficiently large that the current formation is likely to no longer be optimal. Thus a minor change in wind direction or strength may not be sufficient to prompt a prediction of an optimal formation transition, but a more significant change will prompt a prediction of an optimal formation transition.

A timer may be used to ensure that group formation is periodically reassessed, thus accounting for a gradual evolution of internal or external factors that may not be encompassed by other triggers.

Referring still to FIG. 2a, if no trigger condition has occurred, the controller UAV returns to step 210, and receives another periodic update of UAV status information from UAVs in the group.

Referring to FIG. 2b, if a trigger condition has occurred, the controller UAV then proceeds to step 240, and uses a trained machine learning model to predict, on the basis of the first state of the group, an optimal formation transition to a new formation, an optimal formation transition being a transition to a formation that will minimise predicted total energy consumption for all UAVs in the group to complete their tasks. It will be appreciated that completing a task by a UAV comprises the UAV arriving at the destination specified in the task with at least the required minimum residual amount of energy specified in the task and respecting any additional conditions specified in the task. As illustrated in FIG. 2b, the step 240 of using a machine learning model to predict an optimal formation transition comprises, in a first sub step 242, inputting to the trained machine learning model the representation of the first state. Step 240 then comprises, in sub step 244, predicting, by the model, a value parameter associated with different formation transitions from the formation of the first state to possible new formations, and in sub step 246, selecting, by the model, the formation transition having the highest predicted value parameter as the predicted optical optimal formation transition. The value parameter associated with a formation transition comprises the value of a reward function for the formation transition. The reward function is based on inputs including predicted energy consumption for all UAVs in the group to complete their tasks in the first state, predicted energy consumption for all UAVs in the group to complete their tasks in a second state after the formation transition, and compliance with constraints of programmed UAV tasks. The reward function is discussed in further detail below, with reference to step 270.

In step 250, the controller UAV instructs the UAVs in the group to perform the predicted optimal formation transition, so causing the group to adopt the new formation as a consequence of the formation transition selected by the machine learning model. In step 260, the controller UAV receives updated UAV status information from the UAVs in the group, and combines the updated UAV status information with information on the new formation of the group following the formation transition, so forming a representation of a second state of the group.

In step 270, the controller UAV then calculates an updated value of a reward function for the performed formation transition. This reward function is the same as the reward function a value of which was predicted by the machine learning model in step 240. The reward function value that is calculated in step 270 is calculated on the basis of inputs including predicted energy consumption for all UAVs in the group to complete their tasks in the first state as shown at 270a, predicted energy consumption for all UAVs in the group to complete their tasks in the second state as shown at 270b, compliance with constraints of programmed UAV tasks as shown at 270c and movement of individual UAVs between formations as shown at 270d. During step 240, the value of the reward function in the second state was predicted by the machine learning model, but by the time step 270 is performed, the group has transitioned to the second state, and the value of the reward function may therefore be calculated using the updated status information for the group in the second state that was received at step 260. Calculating a value of the reward function comprises incrementing or decrementing the value of the reward function according to the inputs. Thus in one example, a value of the reward function may be incremented if the predicted energy consumption for all UAVs in the group to complete their tasks in the second state is less than the predicted energy consumption for all UAVs in the group to complete their tasks in the first state, and may be decremented if the predicted energy consumption in the second state is greater than in the first state. The value of the reward function may be decremented if, when the UAVs are in the second state, a constraint of a programmed UAV task will not be complied with. Failure to comply with a constraint of a programmed UAV task may include a UAV being unable to arrive at its destination owing to a collision or insufficient energy to reach its destination, a UAV arriving at its destination with less than the required minimum residual energy, violation of flight path restrictions, non-respect of operational limits for UAV components etc. In further examples, the value of the reward function may be decremented for each UAV that is required to change position in order to accomplish the formation transition, so as to avoid frequent formation changes for little energy gain.

The amounts by which the value of the reward function is incremented or decremented may vary according to the particular input concerned, and may be dependent upon a value of the input. Thus the value of the reward function may be increased or decreased proportional to the decrease or increase in predicted energy expenditure in the second state compared to the first state. The value of the reward function may be decremented by a very large amount in the event of a collision or other task non-compliance, to ensure such events do not re-occur. In further examples, the amount by which the value is decremented for a position change may be small compared to amounts by which the value is incremented or decremented as a consequence of other inputs, such that the impact of the position change input on the value of the reward function is less that the impact of other inputs.

Referring still to FIG. 2b, after calculating a value of the reward function for the performed formation transition, the controller UAV in step 280 combines the representation of the first state, the performed formation transition, the representation of the second state and the calculated value of the reward function into a transition experience record and stores the transition experience record in a memory. The transition experience record may provide information on current formation for a future iteration of the method, and may additionally serve as training data for a subsequent offline updating of the machine learning model, as discussed in further detail below.

In step 290, the controller UAV checks whether or not it should cease to be the controller UAV for the group. Various conditions may exist according to which the controller UAV should cease to be the controller UAV for the group. One condition may be that the controller UAV should leave the group. Thus, step 290 may comprise the controller UAV checking its current position against a flight path for its programmed task to determine if it has yet reached its programmed "drop out" location, at which it should leave the group of UAVs and proceed to its destination. Another condition may be that the controller UAV is experiencing a malfunction, such as overheating or some kind of fault, meaning the controller UAV should no longer assume the role of controller UAV for the group. Another condition may be that the controller UAV no longer fulfils criteria for assuming the role of controller UAV for the group. Thus in an example in which the controller UAV assumed the role of controller during flight, having started its flight alone, it may have assumed the role of controller UAV on the basis of fulfilling certain criteria with respect to other UAVs that joined it, so forming a group. In one example, the UAV may have self-configured at the controller UAV after establishing that it had the furthest distance to travel of the UAVs in the newly formed group. If that is no longer the case, for example because other UAVs have joined the group, or because of a change to a programmed task of a UAV, then it may be appropriate for the controller UAV to cease to be controller UAV for the group.

If the controller UAV determines at step 290 that it should continue to be controller UAV for the group, then it returns to step 210, receiving the next periodic update of UAV status information. If the controller UAV determines at step 290 that it should cease to be controller UAV for the group, for example having reached the point at which it should leave the group or for another reason as discussed above, the controller UAV then selects a new controller UAV from among the remaining UAVs of the group at step 292. As shown in FIG. 2c, this selection may be made on the basis of the programmed tasks of the UAVs as shown in 292a and/or on energy remaining in the UAVs as shown in 292b. In one example, the UAV having the furthest distance still to travel to its destination may be selected, to avoid frequent changes of controller UAV. In further examples the UAV having the greatest margin between its predicted remaining energy at destination and minimum residual energy at destination may be selected. Other factor combinations may be envisaged for selecting a new controller UAV. It will be appreciated that in the example of a solo UAV that is joined by one or more other UAVs during a flight, the assessment at step 290 and subsequent selection of a new controller UAV may take place shortly after the new group is formed. In one example, the solo UAV may have been designated as default controller UAV for the or any future group before or shortly after take-off. The default controller UAV may receive status information from the other UAVs of the newly formed group when the group is formed, and may then perform the assessment at 290 to determine if the default controller UAV should continue in its role as controller UAV for the newly formed group or should select another UAV of the newly formed group to become the controller UAV, on the basis of the above discussed factors. In still further examples, the above discussed factors may be used following an information exchange between UAVs of a newly formed group to select a controller UAV for the newly formed group, in the absence of a default controller UAV.

In step 294 the controller UAV notifies UAVs in the group of the identity of the new controller UAV for the group and then in step 296 the now former controller UAV may either leave the group and proceed to its task destination, if this was the reason for ceasing to be controller UAV for the group, or may continue its flight as a member of the group. In such examples, the now former controller UAV may start to perform the steps of a method 300 as discussed below, for example starting at step 320 by sending status information to the new controller UAV of the group.

In some examples of the method 200 (not shown in FIGS. 2a to 2c), instead of a full iteration of the method including a prediction of an optimal formation transition, the controller UAV may cause a single UAV or a subset of the UAVs to change position within an existing formation on detection of a trigger condition. In some examples, if the controller UAV determines that a parameter of a UAV has exceeded a predetermined operational threshold, it may instruct the UAV to move from its current position to a new position in a current formation of the group, the new position being a position in which energy consumption of the UAV will be reduced compared to energy consumption in the current position of the UAV. This option may be selected for example if it is determined that a UAV has exceeded an operating threshold for one of its operating parameters immediately after instructing the group of UAVs to transition to a new formation. Instead of performing a full reiteration of the method and adopting a new formation, the controller drone may simply move the affected UAV within the existing formation. In some examples, the affected UAV may simply be swapped with a UAV in a less demanding position of the formation. In other examples a subset of UAVs in the formation may be reshuffled, in order to accommodate the energy requirements of all UAVs. Thus for example if a UAV experiences an overheating issue then it should be moved to a minimal energy position in the existing formation. This may require a direct swap, if a suitable candidate UAV for swap exists, or a part of the formation may be reorganised or its geometry replaced to accommodate the energy requirements of the UAVs, or multiple UAVs may be reshuffled in the formation. In one example, UAV 1 (overheating) may move from the front of the formation to the back and replace UAV 2. UAV 2 may still need to fly in position of relatively low energy consumption, and so may be moved to the side of the formation but still in a rearward part of the formation, replacing UAV 3. UAV 3 may have significant energy reserves and so may be directed to move to the front of the formation, replacing UAV 1.

Figure 3:
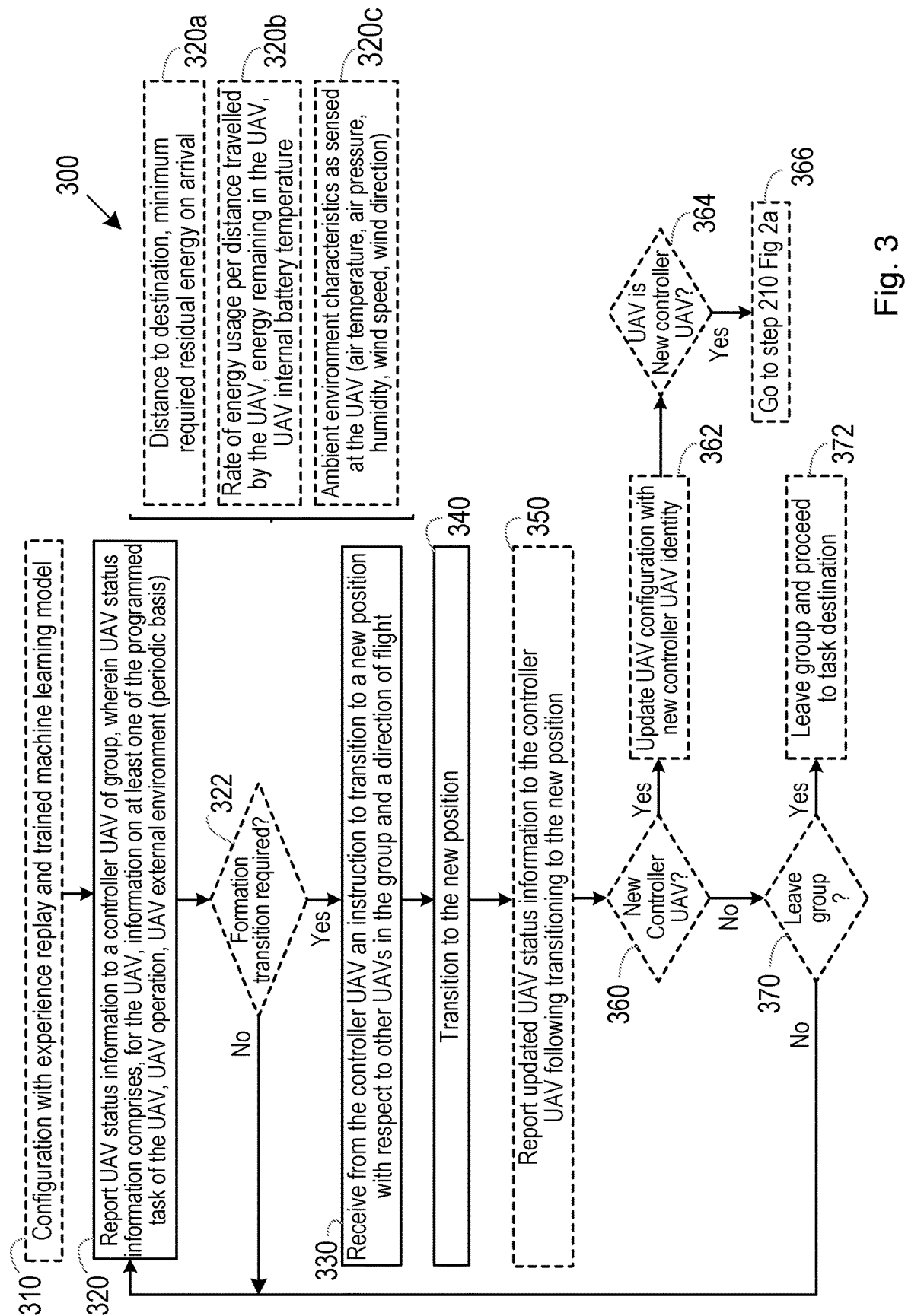
FIG. 3 a flow chart illustrating process steps in a method for operating a UAV.

It will be appreciated that the method 200 described above is performed at least in part on the basis of information supplied by other UAVs in the group of UAVs being managed. FIG. 3 illustrates process steps in another method 300 which may be performed by a UAV in a group of UAVs. The method 300 may compliment the methods 100 and/or 200, performed in a controller UAV of the group. As for the methods 100 and 200 discussed above, the UAV performing the method 300 is programmed with a task to be performed by the UAV and is a member of a group of UAVs that are operable to fly in a formation, a formation comprising a specified position for each UAV with respect to other UAVs in the group and a direction of flight.

Referring to FIG. 3, in a first step 310, the UAV is configured with an experience replay and a trained machine learning mode. This configuration may enable the UAV to take over the role of controller UAV during flight, if required. This configuration step may be performed even if the UAV is initially intended to complete its flight alone, allowing for the possibility of assuming a controller role in the event that the UAV is joined by other UAVs during its flight, so allowing for the formation of a group whose flight may be managed according to examples of the present disclosure. The UAV is also programmed with its task and may be configured with the identity of the controller UAV for the coming flight. In other examples, the controller UAV may inform other UAVs in the group of its identity immediately before or following take-off. In step 320, the UAV reports UAV status information to the controller UAV. As discussed above with reference to method 200, the UAV status information comprises information on at least one of the programmed task of the UAV, UAV operation and/or UAV external environment. Each of these classes of UAV status information is illustrated in further detail in steps 320*a* to 320*c*.

As shown at 320*a*, the information on the programmed task of the UAV may include remaining distance to the UAV's destination and the minimum required residual energy on arrival specified in the programmed task. As shown at 320*b*, the information on UAV operation may comprise at least one of rate of energy usage per distance travelled by the UAV, energy remaining in the UAV and/or UAV internal battery temperature. As shown at 320*c*, the information on UAV external environment may comprise ambient environment characteristics as sensed at the UAV. These characteristics may include air temperature, air pressure, humidity, wind speed and wind direction. The sending of UAV status information to the controller UAV may be repeated on a periodic basis.

In step 322, the UAV may check whether a formation transition is required. As discussed above with reference to FIG. 2*a*, if a trigger condition has occurred then the controller UAV will have identified an optimal formation transition according to the step 240 and will then send an instruction to the UAVs of the group to perform the predicted optimal formation transition. In a majority of status information reporting periods, no trigger condition will have occurred, and so no formation transition will have been instructed by the controller, and the UAV may return to step 320 and send its next UAV status information according to a reporting schedule or periodic reporting. If a formation transition is required, the UAV proceeds to step 330 and receives from the controller UAV an instruction to transition to a new position with respect to other UAVs in the group and a direction of flight. In step 340, the UAV carries out the instruction and transitions to the new position. The transition of this individual UAV may, combined with individual position transitions performed by other UAVs in the group, collectively result in a formation transition being carried out by the group of UAVs. In step 350, the UAV may report updated UAV status information to the controller UAV following transitioning to the new position. This updated UAV status information may enable an impact of the formation change to be assessed. For example, if the UAV reports its rate of energy expenditure, a change in this parameter before and after transition may enable an assessment as to whether the predicted energy expenditure for the UAV to complete its task has increased or decreased following transition to the new position.

In step 360, the UAV checks whether it has been informed of a new controller UAV. If no new controller UAV has been notified, the UAV checks at step 370 whether or not it should leave the group. As discussed above with reference to method 200, the UAV may be programmed with a drop out location at which point it should leave the group and proceed to its destination. If this dropout location has not yet been reached, the UAV may return to step 320 and send the next periodic update of UAV status information.

If, at step 360, it is determined that a new controller UAV has been notified, the UAV then updates its configuration with the identity of the new controller UAV at step 362. In step 364, the UAV checks whether the identity of the new controller UAV is in fact its own identity. If this is the case, then the UAV may assume the role of controller UAV and proceed in step 366 to carry out the steps of the method 100 and/or 200. If the UAV is not the new controller UAV, then the updating step 362 will ensure that future UAV status information will be sent to the correct new controller UAV, and the UAV may proceed to check whether or not it should leave the formation in step 370. If at step 370 the UAV determines that it should leave the group, it may inform the controller UAV of this fact in a message and then drop out of the formation and proceed to its destination in step 372 according to its programmed task.

The method 300 may therefore compliment the method 100 and/or the method 200 to enable management of a group of UAVs to minimise energy consumption of the group while ensuring all UAVs are able to complete their programmed tasks.

Figure 4:
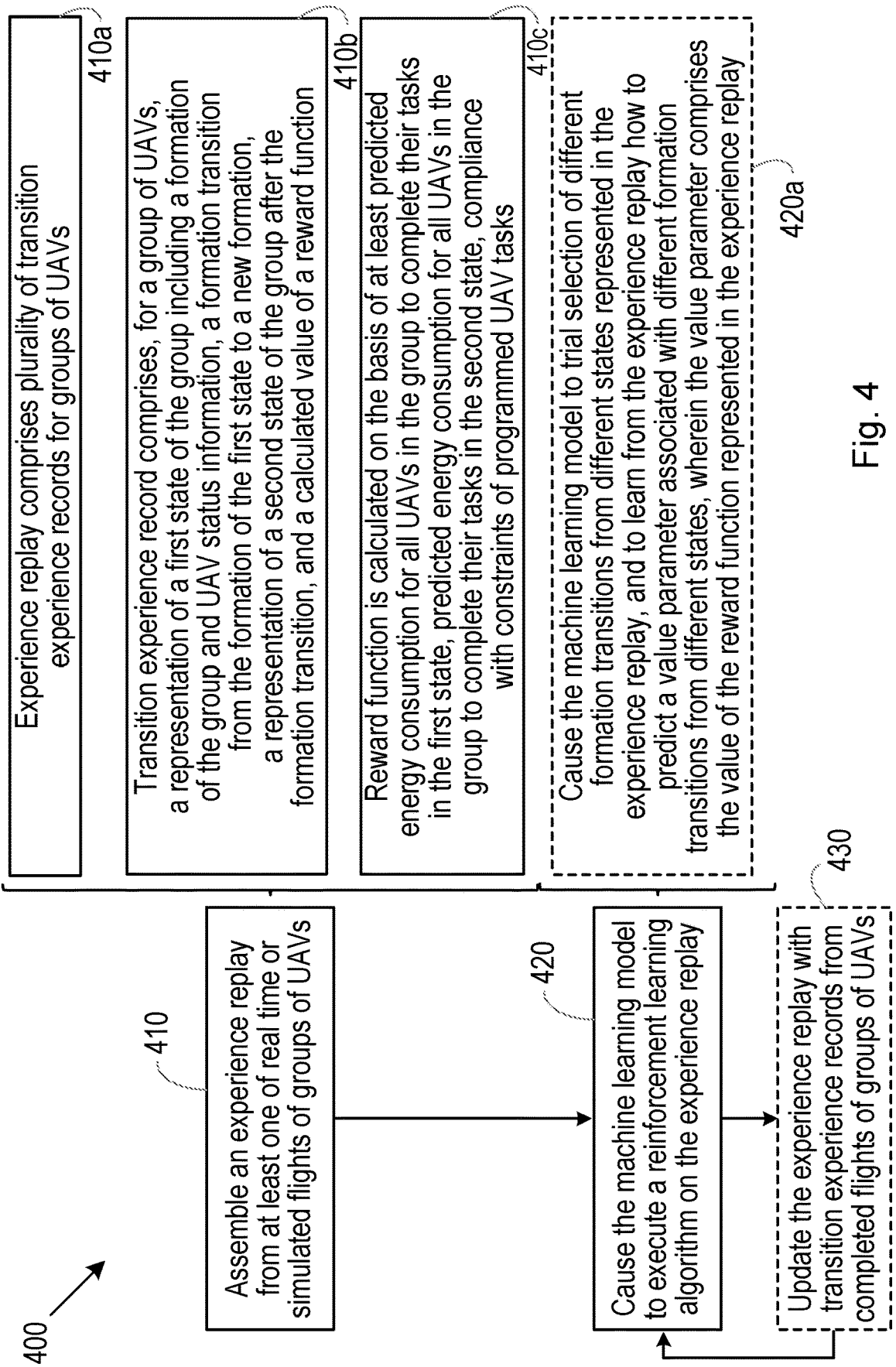
FIG. 4 a flow chart illustrating process steps in a method for training a machine learning model.

It will be appreciated that the machine learning model that is used by the controller UAV for the method 100 and/or 200 is a trained machine learning model. Another aspect of the present disclosure provides a method for training such a machine learning model. FIG. 4 is a flow chart illustrating process steps in a method 400 for training a machine learning model for use in managing a group of UAVs operable to fly in a formation. A for the methods 100, 200 and 300 above, a formation comprises a specified position for each UAV with respect to other UAVs in the group and a direction of flight, and each UAV is programmed with a task to be performed by the UAV. The method may be performed by an apparatus or function. Referring to FIG. 4, in a first step 410, the method comprises assembling an experience replay from at least one of real time or simulated flights of groups of UAVs. As illustrated in 410*a*, an experience replay comprises a plurality of transition experience records for groups of UAVs. As discussed above and illustrated at 410*b*, a transition experience record comprises, for a group of UAVs, a representation of a first state of the group including a formation of the group and UAV status information, a formation transition from the formation of the first state to a new formation, a representation of a second state of the group after the formation transition, and a calculated value of a reward function. The reward function may be a reward function as discussed above with reference to FIGS. 1 and 2, and, as shown at 410*c*, the reward function is calculated on the basis of at least predicted energy consumption for all UAVs in the group to complete their tasks in the first state, predicted energy consumption for all UAVs in the group to complete their tasks in the second state, and compliance with constraints of programmed UAV tasks.

In step 420, the method then comprises causing the machine learning model to execute a reinforcement learning algorithm on the experience replay. This step may comprise, as shown at 420*a*, causing the machine learning model to trial selection of different formation transitions from different states represented in the experience replay, and to learn from the experience replay how to predict a value parameter associated with different formation transitions from different states, wherein the value parameter comprises the value of the reward function represented in the experience replay.

The method 400 may further comprise updating the experience replay with transition experience records from completed flights of groups of UAVs at step 430, and returning to step 420 to cause the machine learning model to execute a reinforcement learning algorithm on the updated experience replay.

Figure 5:
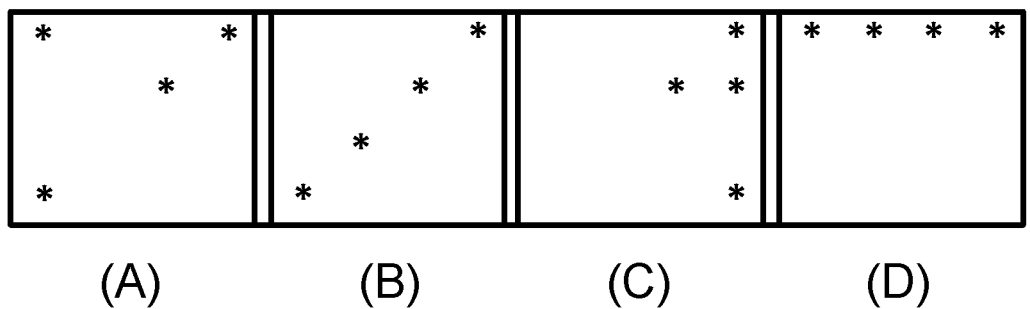
FIG. 5 shows formation options for a group of UAVs.
Figure 6:
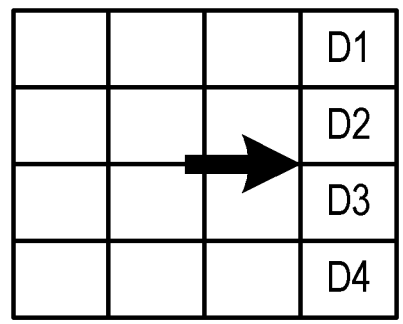
FIG. 6 shows an initial formation for a group of UAVs.

The methods 100, 200, 300 and/or 400 may be implemented to manage the flight of a group of UAVs including any number of individual UAVs. FIGS. 5*a* to 5*d* illustrate some example UAV group formations for a group including four UAVs. In the example of FIG. 5, it is assumed that the UAVs fly in a single plane, restricting the formation to two dimensions. Given an N×N grid and a number M of UAVs, the formation problem may be defined as placing each of the M UAVs in the $N^2$ places available. No two UAVs occupy the same position on the grid. For the illustrated problem, it is assumed that N=M=4. Each formation in FIG. 5 can be written as a vector of position numbers that the UAVs occupy in a clockwise manner starting from top left. For example, the formation in FIG. 5(*a*) can be represented as (1; 4; 7; 13). The formation in FIG. 5(*b*) can be represented as (4; 7; 10; 13). Each formation (a) to (d) illustrated in FIG. 5 is associated with a total predicted energy expenditure for the UAVs in the formation, allowing for a choice between formations to be made so as to minimize this overall energy expenditure.

The predicted energy usage of the entire flock is the sum of the predicted energy usage of each UAV. This quantity depends on internal and external parameters, some of which are presented below:

1. Distance left to be covered by individual UAVs to reach their destination
2. Rate of energy usage of each UAV
3. Energy left in each UAV
4. Ambient temperature and air pressure
5. Battery Temperature for each UAV
6. Rainfall
7. Humidity
8. Wind speed and direction experienced by each UAV As discussed above with reference to FIGS. 1 to 4, each UAV is programmed with a task, and may also be programmed with a path planning associated with that task. Each UAV is thus configured with its destination and may also be configured with the location at which it should leave the group of UAVs, dropping out of formation to proceed directly to its destination. A controller UAV is designated by an operator or administrator of the drones before takeoff of the UAVs. The identity of the controller UAV is communicated to all UAVs in the group. All UAVs are capable of communicating to the controller UAV certain UAV status information. This may include:

a. Distance left to be covered
b. Rate of energy usage
c. Energy left in the UAV
d. Minimum residual energy required by the UAV upon arrival at destination
e. Internal battery temperature
f. Ambient characteristics (temperature, air pressure, humidity, wind speed & direction) as experienced by the UAV The controller UAV is capable of receiving internal energy states, temperatures, usage and information on other external factors from each UAV. The controller UAV has requisite hardware, software and available computing power to run the method 100 and/or 200, and may thus have the resources to solve some optimization problems that are typically posed by machine learning algorithms. As discussed above with reference to FIG. 2, the machine learning model for predicting optimal formation transitions may be configured into the UAVs, including the controller UAV, so that it is present in a memory. The model may be trained offline with the help of historical data in the form of experience replay data comprising previous UAV experiences in real flying situations and/or simulations.

The operator, administrator or other authority, or automated selection functionality, selecting the controller UAV may perform the selection on the basis of several criteria. In the present implementation, the UAV that has to travel the farthest among the group becomes the controller UAV. This minimizes the number of changes to the identity of the controller UAV during the flight. If there is more than one UAV satisfying this criterion, the selection may be made randomly among the available UAVs. As discussed with reference to FIG. 2, the current controller UAV picks the next controller UAV when it is required to leave the formation and the identity of the new controller UAV is communicated to all the UAVs in the group.

As discussed above, methods according to the present disclosure seek to minimize the total energy expenditure of the group of UAVs while ensuring that each UAV reaches its final destination with some minimum amount of residual energy that is specified in its programmed task. The controller UAV receives this information from UAVs in the group, allowing it to be taken into account by the machine learning model.

An iteration of the method 100 or 200, resulting in a change in the formation of the group of UAVs, may be triggered at regular intervals and by other trigger conditions including a UAV leaving the group, a change in external conditions including a change in precipitation, wind speed, wind direction etc., and a UAV exceeding an operating threshold for a parameter. For example if a UAV engine or battery exceeds an optimum temperature, at which power leakage starts increasing beyond a threshold, the position of the UAV may be changed to a rear position where lesser energy consumption is required Communication among UAVs of the group may be conducted using any suitable technology. In order to reduce latency and ensure reliability, particularly in potentially remote locations, Bluetooth® technology may be a suitable option. Other communication technologies including cellular and wireless communication networks may also be considered.

Examples of the present disclosure propose to use machine learning algorithms to find an optimal flying formation for a group of UAVs flying together. For any given formation, the predicted energy usage of the group may be found by considering various constraints as described above. These various scenarios can be modelled as an optimization problem. A number N of UAVs flying together can assume a large number of different formations (N grid positions can be chosen from $N^3$ possible positional choices in a 3D space). Finding the global optimal value of energy usage and its associated formation is a computationally expensive problem, and a data driven machine learning approach may therefore offer the most feasible solution. Machine Learning algorithms are generally adaptive by nature and tend to have the ability to learn from historical data to enhance future performance. A modified reinforcement learning approach is proposed according to examples of the present disclosure.

A reinforcement learning algorithm requires the following parameters to be defined mathematically:

1. State Space:

This represents the values of all the input parameters of the process, internal and external, at any time point t. For the present example, this includes position of each UAV, the energy consumption of each UAV, the distance left to be covered, the internal battery temperatures and the external weather conditions. The following quantities may therefore be defined:

a. The internal state space: $S_t^I = [N, S_t^P, S_t^e, S_t^d]$
b. N is the number of UAVs in the formation
c. $S_t^P$ stores the position of each UAV in the formation at time t.
d. $S_t^e$ is the internal energy state of each UAV. This is composed of 2 arrays:
 $S_t^{\delta,e}$: rate of energy consumed by each UAV.
 $S_t^{left,e}$: energy left in each UAV.
e. $S_t^d$: distance left to be covered by each UAV.
f. $S_t^E$: The external state space. This array consists of
 (1) Ambient temperature
 (2) Battery temperature for each UAV
 (3) Rainfall
 (4) Humidity
 (5) Wind speed
 (6) Wind direction 2. Action Space The action space is the list of all possible formation transitions in the group. For example, referring to the formations of FIG. 5, an action can be to change the formation of the flock from [1, 4, 7, 13] of FIG. 5(a), to the formation [4, 7, 10, 13] of FIG. 5(b). It will be appreciated that the action space is thus somewhat modified compared to an action space of a standard reinforcement learning algorithm. The action space of a standard reinforcement learning algorithm typically comprises very simple actions which, when combined into a sequence of actions, may effect a significant change on the system under considerations. Such actions may for example include "move right one unit", "move left one unit" etc. in a system with agents capable of movement. In contrast, the action state of the learning model according to examples of the present disclosure comprises the set of possible formation transitions. Each action thus represents an accumulation of multiple individual actions on the part of the UAVs of the group. The action space may be further reduced by mapping all states which are equivalent to a single state, so reducing the possible number of states to which the group may transition. This is discussed in further detail below with reference to training of the machine learning model.

3. Reward Function

The reward function provides feedback to enable an assessment of the desirability of different formation transitions. A reward function according to examples of the present disclosure has the following properties:

1. A large negative reward if the action leads to a collision.
2. A large negative reward if the minimum required residual energy for any UAV is not met.
3. A small positive reward if the total predicted energy usage of the flock decreases.
4. A very small negative reward associated with each movement of a UAV, so preventing very frequent changes in the formation, if the reduction in predicted energy usage is very small.

FIGS. 6 to 11 provide an illustration of implementation of the above discussed concepts in a group comprising 4 UAVs. It is assumed that each UAV is fitted with 75 kWh lithium-ion batteries.

1. Each UAV is programmed with a task including a requirement to reach the final destination specified in the task with a minimum residual energy. This is represented by the quantity R. In the present illustration R is set as [25, 50, 50, 25]. This means UAV 1 has to have at least 25 kWh capacity left in it on arrival at the destination, UAV 2 has to have at least 50 kWh capacity left in it on arrival etc.
2. At time t=0, the UAVs receive the external state of the system. $S_0^E = [30°$ C., $40°$ C., $38°$ C., $35°$ C., $36°$ C., NoRain, 75%, 10 kmph, $90°$ ]. This means that the ambient temperature is $30°$ Celsius. The 4 UAVs are currently reporting battery temperatures of 40, 38, 35 and 36 degree Celsius respectively. It is not raining and humidity is at 75%. There is also wind blowing at 10 km per hour from the east.
3. At time t=0, when the UAVs, D1-D4, fly out, it is assumed that they are in some appropriately chosen non-overlapping positions given by the vector $S_0^P = [4, 8, 12, 16]$. Visually this translates to an initial formation illustrated in FIG. 6 with a flying direction from left to right in the Figure. The distance to destination for each UAV is also known. So, $S_0^d = [10$ km, 14 km, 5 km, 20 km]
4. The internal energy state of the UAVs are represented as $S_0^{\delta,e} = [0.25, 0.25, 0.25, 0.25]$ $S_0^{left,e} = [75, 75, 75, 75]$ Each UAV is consuming about 0.25 kWh of power for every kilometer. These quantities are computed internally by each UAV and reported to the controller UAV.

Figures 7, 8:
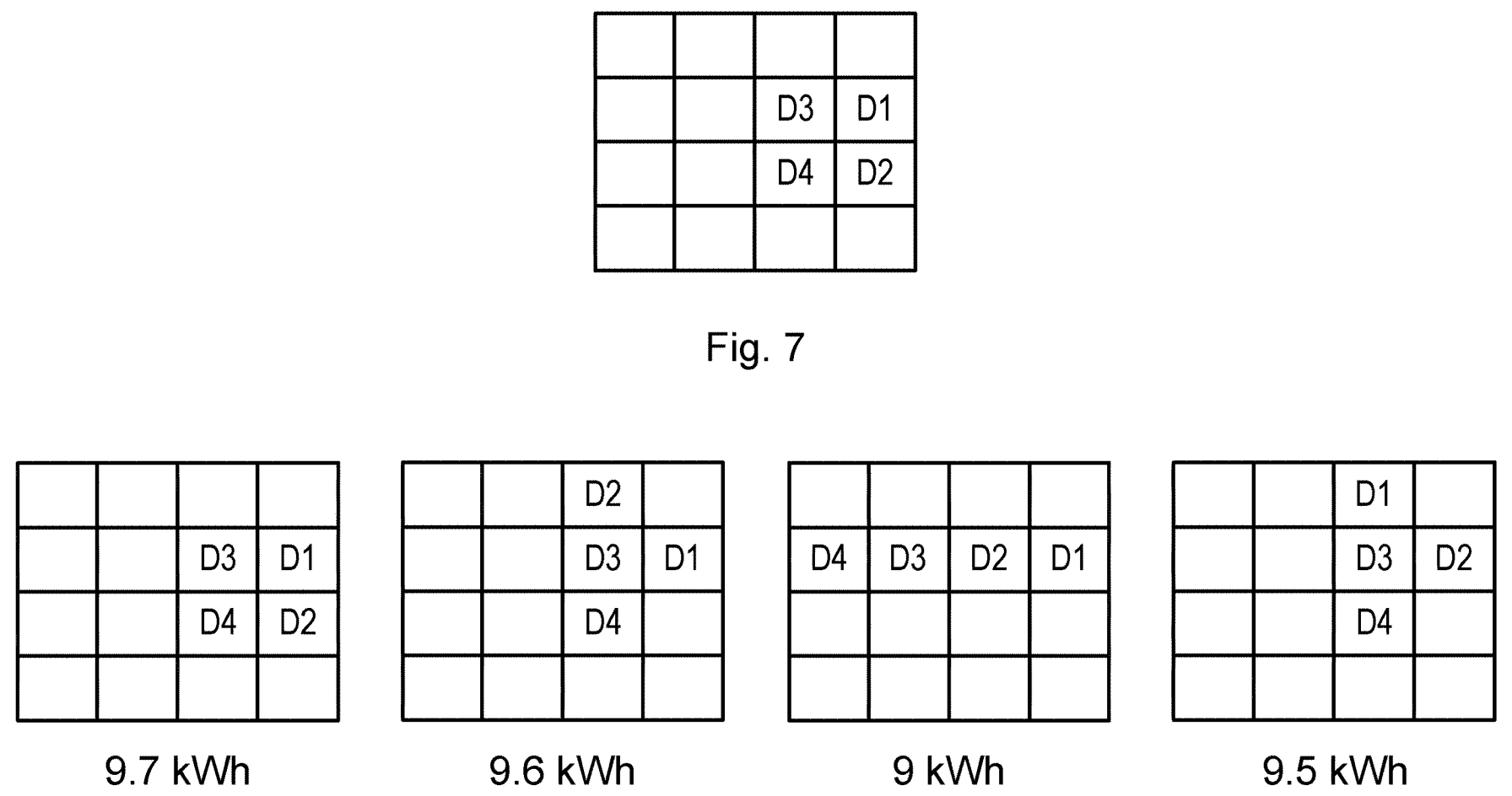

5. Projected Energy Usage of the entire flock at time t=0 can then be computed as $\widehat{E_0}$ =0.25×10+0.25×14+0.25×5+0.25×20=12.25 kWH 6. At time t=1, the controller takes the action to rearrange the UAVs, D1-D4. The new positional state of the flock now becomes $S_1^P$=[8, 12, 7, 11] as illustrated in FIG. 7. The selection of this new formation is discussed below.
7. After the action is taken, the UAVs internally compute the new dynamics are report on their respective energy states:

$S_0^{\delta,e}$=[0:25,0:25,0:2;0.2]

$S_0^{left,e}$=[74;73;74.5;74.5]

UAVs 3 and 4 are now flying behind UAVs 1 and 2. In this new formation UAVs 3 and 4 are therefore leveraging the lift and reduced wind resistance provided by UAVs 1 and 2 ahead of them. As a consequence, UAVs 3 and 4 have reduced their rate of energy usage.

8. Assuming discretized time buckets of 1 minute and a flying speed of 40 km/hour, the group has now covered about 1.5 km from origin. The distance left quantity is recomputed.

$S_1^d$=[8.5 km; 12.5 km; 3.5 km; 18.5 km]

9. As the new action did not result in a collision, the collision component of the reward function contributes 0.
10. The projected energy usage for each UAV is computed as

[0.25×8.5,0.25×12.5,0.2×3.5,0.2×18.5]=[2.125,3.125, 0.7,3.7]

11. The residual energy for each UAV then becomes, $E_1^{left}$=[74−2.125,73−3.125,74.5−0.7,74.5−3.7]= [71.875,69.875,73.8,70.8]

12. At this time all the UAVs satisfy the individual residual energy requirements upon arrival at destination. So the second component of the reward function is also 0.
13. The controller re computes the projected energy usage of the entire flock by summing up the quantities from step 10.

$\widehat{E_1}$ =9.65 kWh

14. Assuming a reward of 10 points for every kWh reduction in projected energy, the controller now receives a reward of 26 points, because it managed to reduce the projected consumption by approximately 2.6 kWh.

In the above illustration the controller UAV selected a new formation for the group at step 6. There could be other formations in which it could have minimized the predicted energy usage even further, and by consequence gained a higher value of the reward function. Alternative formations for UAVs 1 to 4 and their associated predicted energy usage are illustrated in FIG. 8, with flying direction again from left to right.

Figure 10:
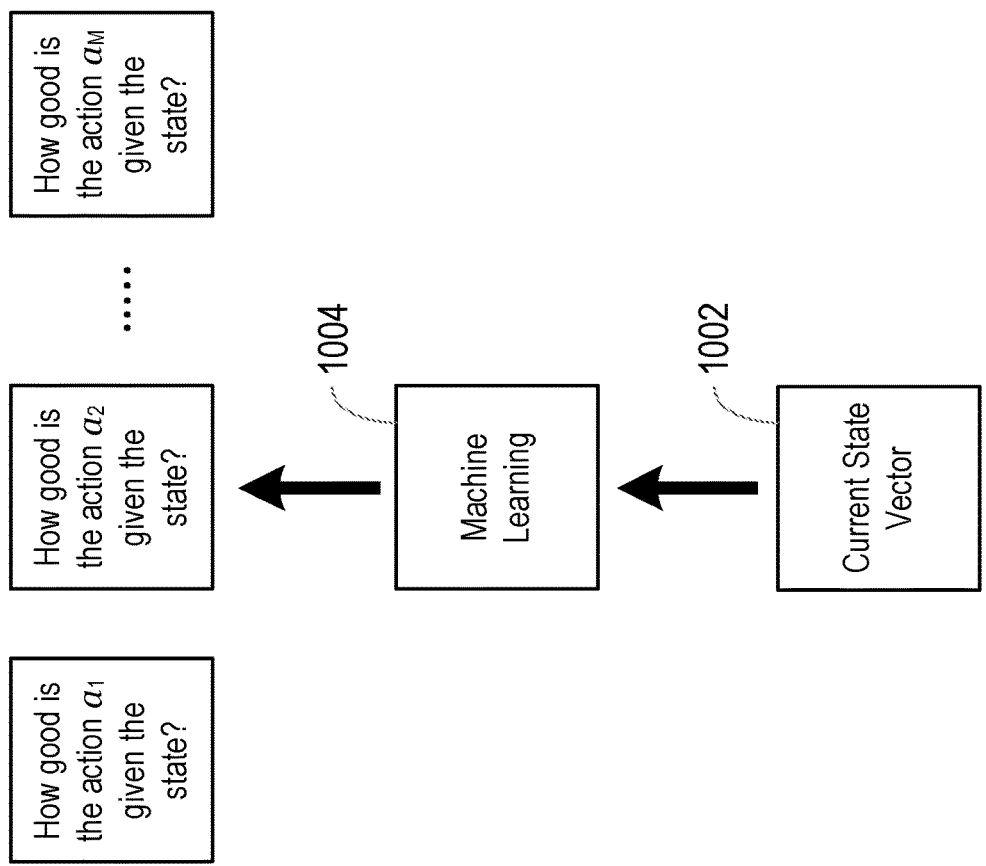
FIG. 10 illustrates another example of machine learning process.
Figure 9:
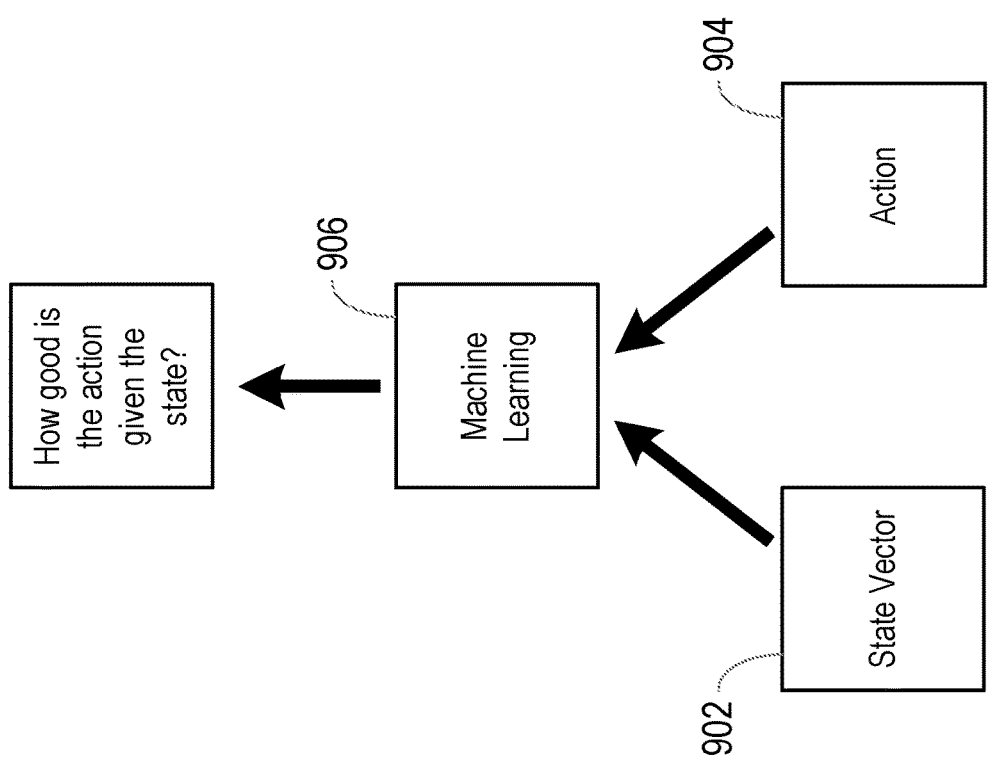
FIG. 9 illustrates a machine learning process.

It will be appreciated that there are $^{16}P_4$=16×15×14× 13=43, 680 different possible states in which the 4 UAVs can arrange themselves. It is computationally not feasible to enumerate the reward for each individual possible state. Instead of attempting to calculate the reward for each possible state, aspects of the present disclosure propose to use a machine learning model to find the optimal state with the highest value of the reward function. FIGS. 9 and 10 illustrate two options for predicting a value of a reward function for different states. In the process of FIG. 9, given a vector 902 of a current state s and an action a 904 (comprising a transition to a new formation), a machine learning classifier model 906 may estimate the value of the reward function if the action a is taken when the group is in the state s. In the process of FIG. 10, given a vector 1002 of a current state s, a predictive model 1004 may estimate the value of the reward function for all possible actions which may be taken in the state s. Once the value of the reward function has been predicted, using any appropriate process including those of FIG. 9 or 10, the action producing the highest value of the reward function may be selected as the optimal action for the group.

The machine learning model for predicting the value of the reward function for different actions may first be trained using training data, so that the parameters for the model may be estimated. It is proposed that the training data be based upon an experience replay. Every time a decision is made by a controller UAV to take an action from a state, the entire sequence of old state, the action, the new state, the reward is stored into a data set called the experience replay, D=$e_1$, $e_2$, ... $e_n$, where $e_t$=($s_t$,$a_t$,$r_t$, $s_{(t+1)}$) is the experience at time step t. The experience replay acts as the experience and knowledge bank for the machine learning model, allowing the model to learn from actions taken in the past and the reward generated by such actions. Information on new experiences (that is sequences of old state, action, new state and reward) may be stored by a controller UAV during a flight. These experiences may later be downloaded and added to a training data set to allow for updating of the model with the increased set of training data.

Figure 11:
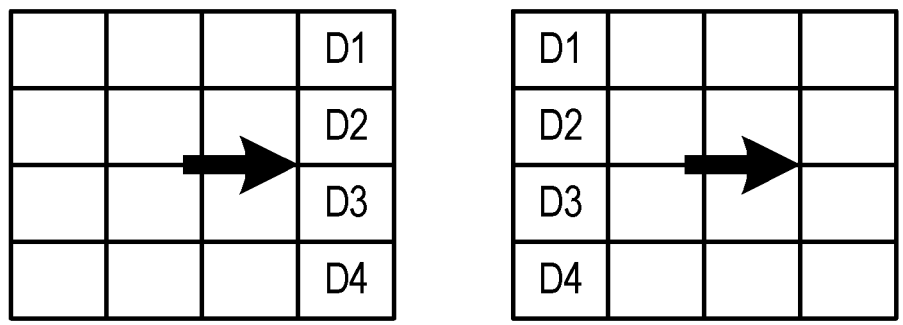
FIG. 11 illustrates equivalent formations for the group of UAVs of FIG. 6.

As mentioned above, in some examples, a preprocessing function φ may be applied to the states to reduce the number of possible states before training the machine learning model. For example, many UAV formations are essentially equivalent, and may be mapped to a single state to reduce the state space for learning, and consequently also reduce the action space. FIG. 11 illustrates an example of two UAV formations that are equivalent, and may be mapped to a single state. The experience replay may be assembled both from live flying data and from simulations. Assembling an experience reply including a wide range of external conditions and decisions taken for groups of varying sizes may ensure that the machine learning model is trained to select an optimal formation transition for different sizes of group (different numbers N of UAVs) and for different flying conditions.

Figure 12:
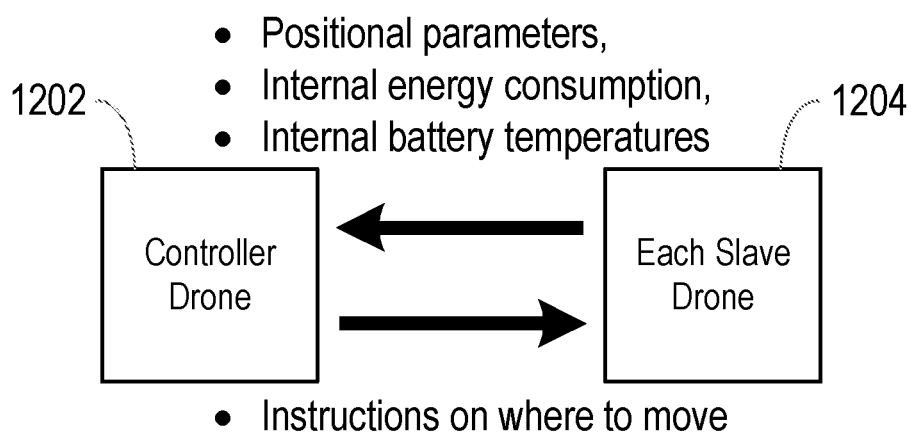
FIG. 12 illustrates information exchange between a controller UAV and a slave UAV

FIG. 12 illustrates message flow between a controller UAV, labelled as Controller Drone 1202 and a UAV of the controller drone's group, labelled as Slave Drone 1204. Each slave drone 1204 sends to the controller drone 1202 its UAV status information, including for example positional information, internal energy consumption and internal battery temperature. The controller drone 1202 sends to the slave drone instructions on what position to take up during a formation transition.

Figure 13:
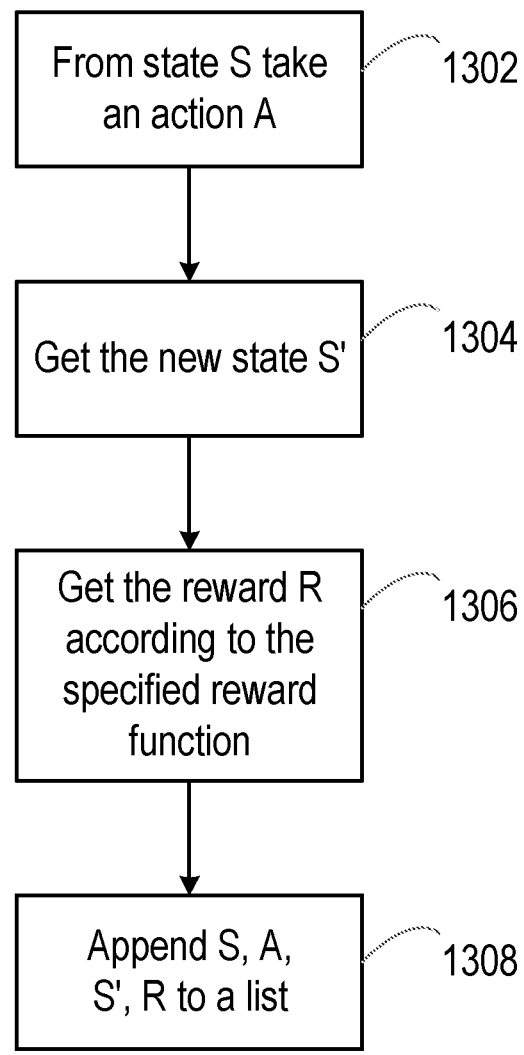
FIG. 13 illustrates assembly of an experience replay.

FIG. 13 illustrates the assembling of an experience replay by a controller UAV. At 1302, an action A is taken from a state S. At 1304, the new state S' is obtained, including the new formation and updated UAV status parameters. At 1306, the reward R according to the specified reward function is calculated, and finally at 1308, the old state S, action A, new state S' and reward R are appended to a list that forms the experience replay.

Figure 14:
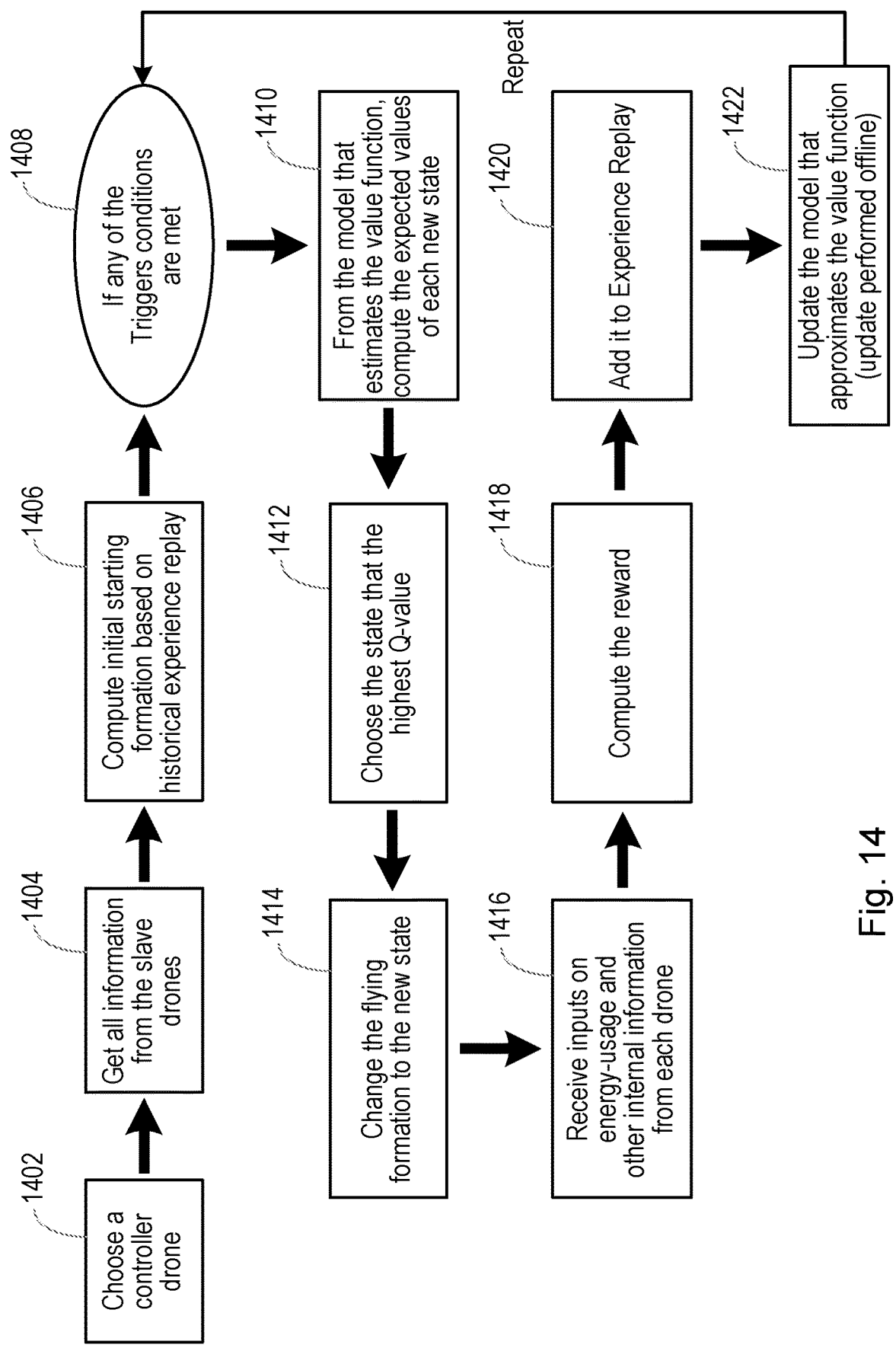
FIG. 14 is a flow chart illustrating an example implementation of the method of FIG. 2.

FIG. 14 illustrates an example implementation of the methods 200 of FIG. 2 and 300 of FIG. 3. At 1402, a controller UAV is selected from a group of UAVs. The selected controller UAV then obtains UAV status information from the UAVs in its group at 1404 and selects an initial flying formation at 1406. The initial flying formation is selected on the basis of the experience replay saved in the controller UAV and the initial UAV status information. The controller UAV then checks whether any trigger conditions are met at 1408. If a trigger condition is met, the controller UAV at 1410 uses the machine learning model saved in its memory to predict the value of the reward function for different states given the current state of the group. At 1412, the controller UAV uses the model to select the state/action that has the highest value of the reward function and at 1414, the controller UAV causes the UAVs of the group to take the selected action, that is to transition to the formation of the new selected state. At 1416, the controller UAV receives updated UAV status information from the UAVs of the group and at 1418, the controller UAV computes the value of the reward function or the new state. In 1420, the computed reward is added to the experience replay with the old stats, new state and action. At 1422, the model is updated using the new experience. This updating may take place offline, after the UAVs have completed their flight. The controller UAV then returns to 1408 to check for a new trigger condition.

Figure 15:
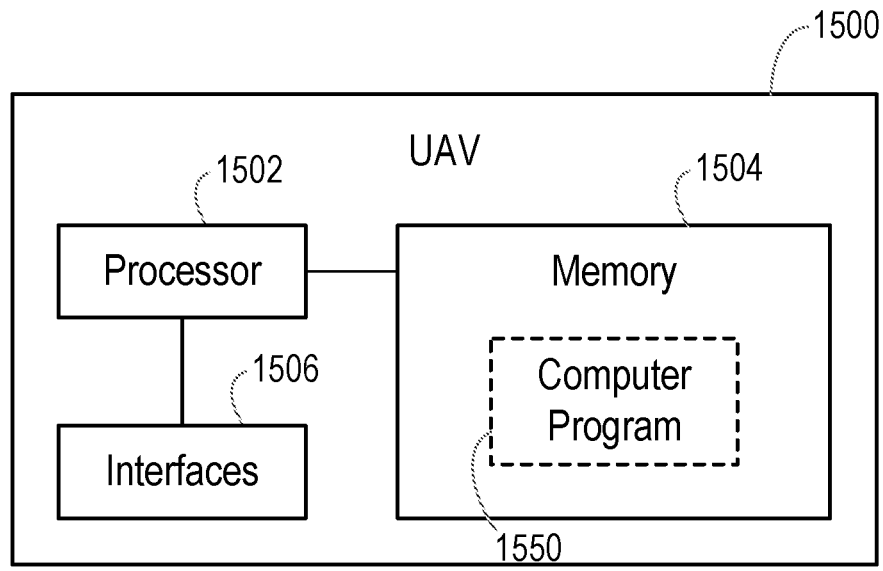
FIG. 15 is a block diagram illustrating functional units in a UAV.

As discussed above, the methods 100, 200 and/or 300 may be performed by a UAV. FIG. 15 is a block diagram illustrating an example UAV 1500 which may implement the methods 100, 200 and/or 300 according to examples of the present disclosure, for example on receipt of suitable instructions from a computer program 1550. Referring to FIG. 15, the UAV 1500 comprises a processor or processing circuitry 1502, a memory 1504 and interfaces 1506. The memory 1504 contains instructions executable by the processor 1502 such that the UAV 1500 is operative to conduct some or all of the steps of the method 100, 200 and/or 300. The instructions may also include instructions for executing one or more telecommunications and/or data communications protocols. The instructions may be stored in the form of the computer program 1550. In some examples, the processor or processing circuitry 1502 may include one or more microprocessors or microcontrollers, as well as other digital hardware, which may include digital signal processors (DSPs), special-purpose digital logic, etc. The processor or processing circuitry 1502 may be implemented by any type of integrated circuit, such as an Application Specific Integrated Circuit (ASIC), Field Programmable Gate Array (FPGA) etc. The memory 1504 may include one or several types of memory suitable for the processor, such as read-only memory (ROM), random-access memory, cache memory, flash memory devices, optical storage devices, solid state disk, hard disk drive etc.

Figure 16:
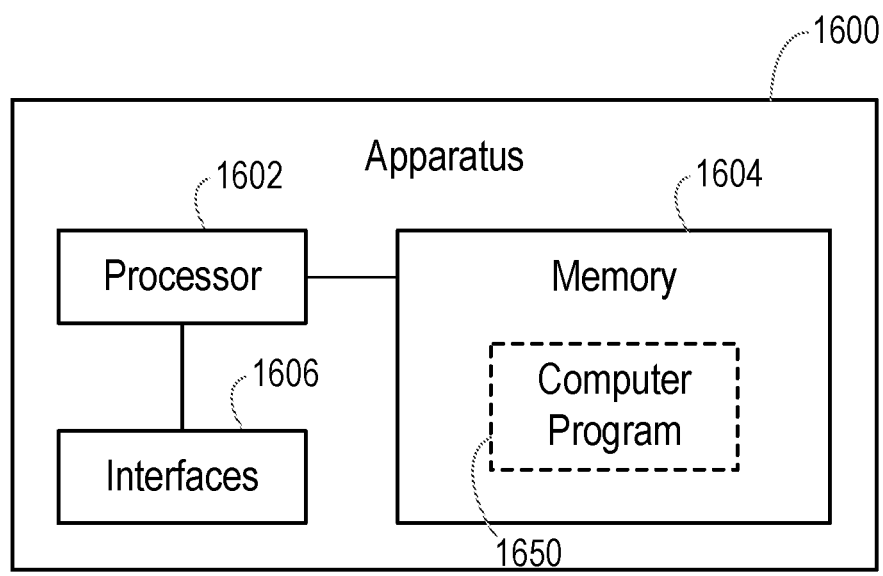
FIG. 16 is a block diagram illustrating functional units in an apparatus.

FIG. 16 is a block diagram illustrating an example apparatus 1600 which may implement the method 400 according to examples of the present disclosure, for example on receipt of suitable instructions from a computer program 1650. Referring to FIG. 15, the apparatus 1600 comprises a processor or processing circuitry 1602, a memory 1604 and interfaces 1606. The memory 1604 contains instructions executable by the processor 1602 such that the apparatus 1600 is operative to conduct some or all of the steps of the method 400. The instructions may also include instructions for executing one or more telecommunications and/or data communications protocols. The instructions may be stored in the form of the computer program 1650. In some examples, the processor or processing circuitry 1602 may include one or more microprocessors or microcontrollers, as well as other digital hardware, which may include digital signal processors (DSPs), special-purpose digital logic, etc. The processor or processing circuitry 1602 may be implemented by any type of integrated circuit, such as an Application Specific Integrated Circuit (ASIC), Field Programmable Gate Array (FPGA) etc. The memory 1604 may include one or several types of memory suitable for the processor, such as read-only memory (ROM), random-access memory, cache memory, flash memory devices, optical storage devices, solid state disk, hard disk drive etc.

Figure 17:
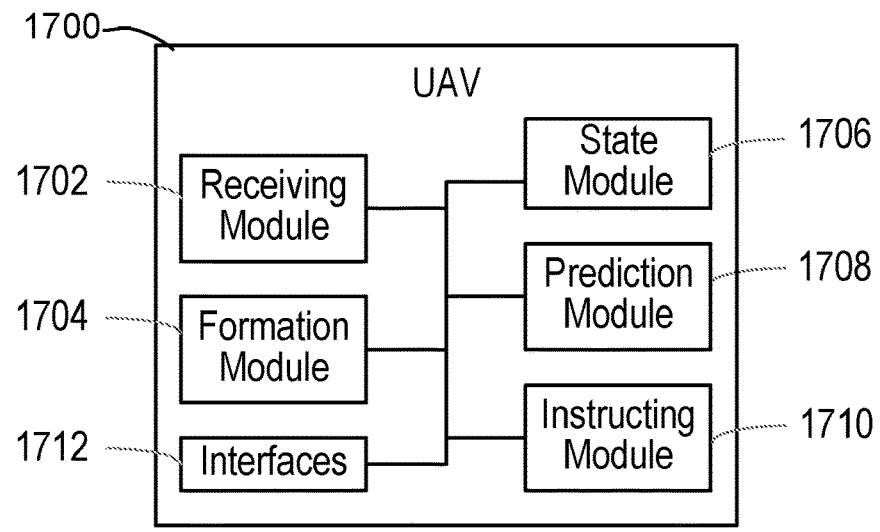
FIG. 17 is a block diagram illustrating functional units in another example of UAV.

FIG. 17 illustrates functional modules in another example of UAV 1700 which may execute examples of the method 100 and/or 200 of the present disclosure, for example according to computer readable instructions received from a computer program. It will be understood that the modules illustrated in FIG. 17 are functional modules, and may be realised in any appropriate combination of hardware and/or software. The modules may comprise one or more processors and may be integrated to any degree.

Referring to FIG. 17, the UAV 1700 comprises a receiving module 1702 for receiving UAV status information from UAVs in the group, wherein UAV status information comprises, for a UAV, information on at least one of the programmed task of the UAV, UAV operation, and/or UAV external environment. The UAV 1700 further comprises a formation module 1704 for obtaining information on a current formation of the group and a state module 1706 for combining the received UAV status information with the information on current group formation to form a representation of a first state of the group. The UAV 1700 further comprises a prediction module 1708 for using a trained machine learning model to predict, on the basis of the first state of the group, an optimal formation transition to a new formation, wherein an optimal formation transition is a transition to a formation that will minimize predicted total energy consumption for all UAVs in the group to complete their tasks. The UAV 1700 further comprises an instructing module 1710 for instructing the UAVs in the group to perform the predicted optimal formation transition, and interfaces 1712

Figure 18:
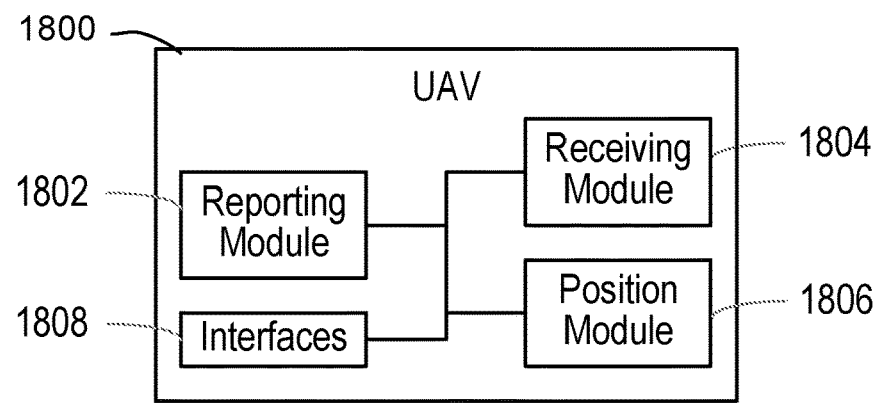
FIG. 18 is a block diagram illustrating functional units in another example of UAV.

FIG. 18 illustrates functional modules in another example of UAV 1800 which may execute examples of the method 300 of the present disclosure, for example according to computer readable instructions received from a computer program. It will be understood that the modules illustrated in FIG. 18 are functional modules, and may be realised in any appropriate combination of hardware and/or software. The modules may comprise one or more processors and may be integrated to any degree.

Referring to FIG. 18, the UAV 1800 comprises a reporting module 1802 for reporting UAV status information to a controller UAV of the group, wherein UAV status information comprises, for the UAV, information on at least one of the programmed task of the UAV, UAV operation, and/or UAV external environment. The UAV 1800 further comprises a receiving module 1804 for receiving from the controller UAV an instruction to transition to a new position with respect to other UAVs in the group and a direction of flight. The UAV 1800 further comprises a position module 1806 for transitioning to the new position and interfaces 1808.

It will be appreciated that in many examples a single UAV may comprise the functional modules of both UAV 1800 and UAV 1700, allowing for operation of a UAV as a member of a group or as a controller UAV of a group, consistent with the possibility for a UAV to cease being a controller UAV for a group during a flight but continue as a member of the group, or to take over the role of controller UAV during a flight. In such examples a single receiving module may be for both receiving status updates when operating as a controller UAV and for receiving an instruction to transition to a new formation when operating as a member of a UAV group.

Figure 19:
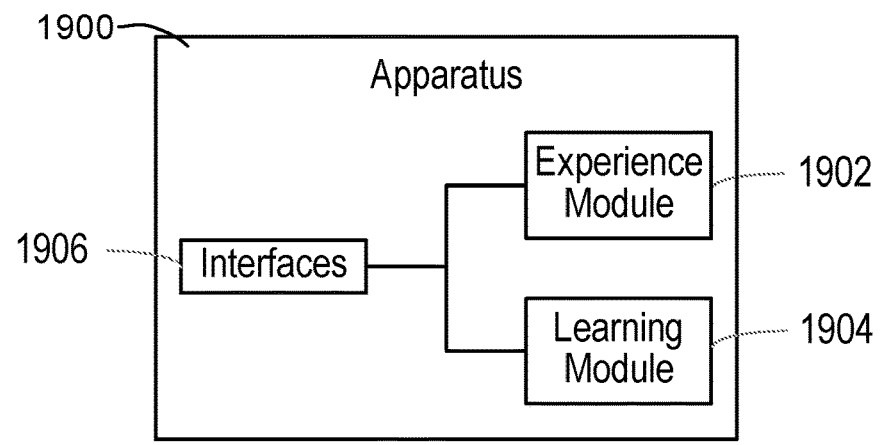
FIG. 19 is a block diagram illustrating functional units in another example of apparatus.

FIG. 19 illustrates functional modules in another example of apparatus 1900 which may execute examples of the method 400 of the present disclosure, for example according to computer readable instructions received from a computer program. It will be understood that the modules illustrated in FIG. 19 are functional modules, and may be realised in any appropriate combination of hardware and/or software. The modules may comprise one or more processors and may be integrated to any degree.

Referring to FIG. 19, the apparatus 1900 comprises an experience module 1902 for assembling an experience replay from at least one of real time or simulated flights of groups of UAVs. The apparatus further comprises a learning module 1904 for causing the machine learning model to execute a reinforcement learning algorithm on the experience replay. The experience replay comprises a plurality of transition experience records for groups of UAVs and wherein a transition experience record comprises, for a group of UAVs, a representation of a first state of the group including a formation of the group and UAV status information, a formation transition from the formation of the first state to a new formation, a representation of a second state of the group after the formation transition, and a calculated value of a reward function. The reward function is calculated on the basis of at least predicted energy consumption for all UAVs in the group to complete their tasks in the first state, predicted energy consumption for all UAVs in the group to complete their tasks in the second state and compliance with constraints of programmed UAV tasks. The apparatus 1900 further comprises interfaces 1906.

Aspects of the present disclosure thus provide methods according to which the overall energy expenditure of a group of UAVs may be minimized while ensuring that all UAVs complete their programmed tasks. A machine learning algorithm is used to predict the value of different formation transitions on the basis of a current state of the group, the state including parameters relating to individual UAVs and their external environment, including weather conditions. The value of a formation depends upon its capacity to minimize overall energy expenditure of the group while conforming to constraints including:
  a. Ensuring all UAVs are able to reach their destinations
  b. Minimising energy leakage due to overheating
  c. Satisfying residual power requirements specified in UAV programmed tasks
  d. Conforming to regulatory flying requirements Reducing overall energy expenditure of a group of UAVs reduces the carbon footprint of the tasks performed by the UAVs as well as representing an economic saving. In addition, the flight radius for UAVs may be extended, and UAVs with little remaining energy may benefit from advantageous positions in a formation to safely reach an energy station or hub before reaching critically low energy reserves. Collaborative and intelligent formations may assist with smart communication among the UAVs for accomplishing critical missions, in addition to facilitating operator regulation of UAV movement in public airspace.

Examples of the methods disclosed herein allow for the intelligent reorganisation of a group of UAVs into a new formation based on changing external and internal dynamics of a system comprising the UAVs. Any UAV may leave the group at any time to reach its destination and the remaining group members are reorganised in to a new formation on the basis of the current external conditions, residual energy profiles and the remaining distance to be covered by UAVs in the group. Similarly, a new UAV can join the group and the group formation updated to accommodate the new group member.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended items. The word "comprising" does not exclude the presence of elements or steps other than those listed in an item, "a" or "an" does not exclude a plurality, and a single processor or other unit may fulfil the functions of several units recited in the items. Any reference signs in the items shall not be construed so as to limit their scope.

The invention claimed is:

1. A method performed by a controller for managing a group of Unmanned Aerial Vehicles (UAVs) operable to fly in a formation that includes a specified position for each UAV with respect to other UAVs in the group and a direction of flight, each UAV being programmed with a task, the method comprising:
  combining UAV status information received from at least two UAVs in the group with information on current group formation to form a representation of a first state of the group, the UAV status information including, for each of the at least two UAVs in the group, information on the programmed task of the UAV, UAV operation, and UAV external environment;
  detecting occurrence of a trigger condition from a predetermined group of trigger conditions;
  responsive to detecting the occurrence of the trigger condition, using a trained machine learning model to predict, on the basis of the first state of the group, a value parameter associated with different formation transitions from the formation of the first state to possible new formations, comprising:
    inputting to the trained machine learning model the representation of the first state;
    predicting, by the model, the value parameter; and
    selecting, by the model, an optimal formation transition, that has the highest predicted value parameter as the predicted optimal formation transition, the optimal formation transition being the transition to the formation that will minimize predicted total energy consumption for all UAVs in the group to complete their tasks by performing UAV reshuffling in an otherwise maintained formation; and
  instructing the UAVs in the group to perform the predicted optimal formation transition.

2. The method of claim 1, wherein information on the programmed task of the UAV comprises at least one of:
  distance to destination; and
  minimum required residual energy on arrival.

3. The method of claim 1, wherein information on UAV operation comprises at least one of:
rate of energy usage per distance travelled by the UAV;
energy remaining in the UAV; and
UAV internal battery temperature.

4. The method of claim 1, further comprising receiving updated UAV status information from UAVs in the group and combining the updated UAV status information with information on the formation of the group following the formation transition, to form a representation of a second state of the group.

5. The method of claim 4, further comprising calculating a value of a reward function for the performed formation transition, wherein the reward function is calculated on the basis of inputs including at least:
predicted energy consumption for all UAVs in the group to complete their tasks in the first state;
predicted energy consumption for all UAVs in the group to complete their tasks in the second state; and
compliance with constraints of programmed UAV tasks.

6. The method of claim 5, wherein the reward function is further calculated on the basis of movement of individual UAVs between the formation of the first state and the formation after the formation transition.

7. The method of claim 1, wherein the value parameter associated with a formation transition comprises the value of a reward function for the formation transition,
wherein the reward function is based on:
predicted energy consumption for all UAVs in the group to complete their tasks in the first state;
predicted energy consumption for all UAVs in the group to complete their tasks in a second state after the formation transition; and
compliance with constraints of programmed UAV tasks.

8. The method of claim 1, wherein receiving UAV status information from UAVs in the group comprises receiving the UAV status information on a periodic basis.

9. The method of claim 1, further comprising:
determining that a parameter of the UAV has exceeded a predetermined operational threshold; and
instructing the UAV to move from its current position to a new position, the new position being a position in which energy consumption of the UAV will be reduced compared to energy consumption in the current position of the UAV.

10. The method of claim 1, further comprising:
selecting an initial formation for the group on the basis of initial UAV status information and an experience replay stored in a memory of the controller UAV;
wherein the experience replay comprises a plurality of transition experience records for groups of UAVs, and wherein a transition experience record comprises, for each group of UAVs, a representation of a first state of the group including a formation of the group and UAV status information, a formation transition from the formation of the first state to a new formation, a representation of a second state of the group after the formation transition and a calculated value of a reward function; and wherein the reward function is calculated on the basis of at least:
predicted energy consumption for all UAVs in the group to complete their tasks in the first state;
predicted energy consumption for all UAVs in the group to complete their tasks in the second state; and
compliance with constraints of programmed UAV tasks.

11. The method of claim 1, further comprising:
determining that the controller UAV should cease to be the controller UAV for the group;
selecting a new controller UAV from among the remaining UAVs in the group; and
notifying UAVs in the group of the identity of the new controller UAV.

12. The method of claim 1, wherein the predetermined group of trigger conditions comprises at least one of:
a change in a composition of the group of UAVs;
overheating internal battery; and
a change in UAV external environment for UAVs in the group that exceeds a variation threshold.

13. A method for operating an Unmanned Aerial Vehicle (UAV), wherein the UAV is programmed with a task to be performed by the UAV and wherein the UAV is a member of a group of UAVs that are operable to fly in a formation, the formation comprising a specified position for each UAV with respect to other UAVs in the group and a direction of flight, the method, performed in the UAV, comprising:
reporting UAV status information to a controller of the group, the UAV status information being usable by the controller to check for occurrence of a trigger condition from a predetermined group of trigger conditions to predict an optimal formation transition, the UAV status information including information on the programmed task of the UAV, UAV operation, and UAV external environment;
receiving, from the controller, in response to the occurrence of the trigger condition, an instruction to perform the predicted optimal formation transition which includes a transition to a new direction with respect to at least another one of the UAVs in the group; and
transitioning to the new direction by performing UAV reshuffling in an otherwise maintained formation.

14. The method of claim 13, wherein the task to be performed by the UAV comprises a destination to which the UAV must fly and a minimum residual amount of energy that must remain in the UAV on arrival at the destination.

15. The method of claim 13, wherein information on the programmed task of the UAV comprises at least one of:
distance to destination; and
minimum required residual energy on arrival.

16. The method of claim 13, wherein information on UAV operation comprises at least one of:
rate of energy usage per distance travelled by the UAV;
energy remaining in the UAV; and
UAV internal battery temperature.

17. The method of claim 13, further comprising:
determining that a parameter of the UAV has exceeded a predetermined operational threshold; and
reporting to the controller UAV that the parameter of the UAV has exceeded the predetermined operational threshold.

18. An Unmanned Aerial Vehicle (UAV) operable to fly in a formation with a group of UAVs and to operate as a controller of the group of UAVs, the formation includes a specified position for each UAV with respect to other UAVs in the group and a direction of flight, and each UAV of the group is programmed with a task to be performed by that UAV, the UAV comprising:
a processor; and
memory coupled to the processor and including instructions executable by the processor to cause the UAV to perform operations comprising:
combining UAV status information received from at least two UAVs in the group with information on current group formation to form a representation of a first state of the group, the UAV status information including, for each of the at least two UAVs in the group, information on the programmed task of the UAV, UAV operation, and UAV external environment;

detecting occurrence of a trigger condition from a predetermined group of trigger conditions;

responsive to detecting the occurrence of the trigger condition, using a trained machine learning model to predict, on the basis of the first state of the group, a value parameter associated with different formation transitions from the formation of the first state to possible new formations, comprising:
  inputting to the trained machine learning model the representation of the first state;
  predicting, by the model, the value parameter; and
  selecting, by the model, an optimal formation transition, that has the highest predicted value parameter as the predicted optimal formation transition, the optimal formation transition being the transition to the formation that will minimize predicted total energy consumption for all UAVs in the group to complete their tasks by performing UAV reshuffling in an otherwise maintained formation; and instructing the UAVs in the group to perform the predicted optimal formation transition.

19. An Unmanned Aerial Vehicle (UAV) operable to fly in a formation with a group of UAVs, the UAV being programmed with a task to be performed by the UAV and the UAV being a member of the group of UAVs that are operable to fly in the formation that includes a specified position for each UAV with respect to other UAVs in the group and a direction of flight, the UAV comprising:
  a processor; and
  memory coupled to the processor and including instructions executable by the processor to cause the UAV to perform operations comprising:
    reporting UAV status information to a controller of the group, the UAV status information being usable by the controller to check for occurrence of a trigger condition from a predetermined group of trigger conditions to predict an optimal formation transition, the UAV status information including information on the programmed task of the UAV, UAV operation, and UAV external environment;
    receiving, from the controller, in response to the occurrence of the trigger condition, an instruction to perform the predicted optimal formation transition which includes a transition to a new direction with respect to at least another one of the UAVs in the group; and
    transitioning to the new direction by performing UAV reshuffling in an otherwise maintained formation.

* * * * *